US012044129B2

(12) United States Patent
McGuire

(10) Patent No.: US 12,044,129 B2
(45) Date of Patent: *Jul. 23, 2024

(54) ROTARY MANIFOLD FOR A COHESION-TYPE DRIVE

(71) Applicant: McGuire Aero Propulsion Solutions Inc., Toronto (CA)

(72) Inventor: Daniel Matthew McGuire, Toronto (CA)

(73) Assignee: McGuire Aero Propulsion Solutions Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,841

(22) Filed: Dec. 21, 2022

(65) Prior Publication Data

US 2023/0272717 A1 Aug. 31, 2023

Related U.S. Application Data

(60) Continuation of application No. 16/943,683, filed on Jul. 30, 2020, now Pat. No. 11,572,788, which is a division of application No. 15/821,808, filed on Nov. 23, 2017, now Pat. No. 10,794,239.

(60) Provisional application No. 62/426,109, filed on Nov. 23, 2016, provisional application No. 62/426,122, filed on Nov. 23, 2016.

(51) Int. Cl.
| | |
|---|---|
| F01D 1/36 | (2006.01) |
| F01D 1/32 | (2006.01) |
| F01D 1/34 | (2006.01) |
| F01L 1/32 | (2006.01) |
| F01L 1/34 | (2006.01) |
| F01L 1/36 | (2006.01) |
| F02C 3/16 | (2006.01) |

(52) U.S. Cl.
CPC ............... *F01D 1/36* (2013.01); *F01D 1/32* (2013.01); *F01D 1/34* (2013.01); *F01L 1/32* (2013.01); *F01L 1/34* (2013.01); *F01L 1/36* (2013.01); *F02C 3/16* (2013.01); *F02C 3/165* (2013.01)

(58) Field of Classification Search
CPC ..... F01D 1/32; F01D 1/34; F01D 1/36; F01D 5/043; F01D 5/048; F02C 3/16; F02C 3/165; F04D 25/045; F01L 1/36
See application file for complete search history.

(56) References Cited

U.S. PATENT DOCUMENTS

| | | | |
|---|---|---|---|
| 1,061,206 | A | 5/1913 | Tesla |
| 3,007,311 | A | 11/1961 | Amero |
| 3,748,057 | A | 7/1973 | Eskeli |
| 3,899,875 | A | 8/1975 | Oklejas et al. |
| 3,999,377 | A | 12/1976 | Oklejas et al. |
| 4,017,209 | A | 4/1977 | Bodman |

(Continued)

FOREIGN PATENT DOCUMENTS

| | | |
|---|---|---|
| EP | 2522808 A1 | 11/2012 |
| EP | 3103962 A1 | 12/2016 |

*Primary Examiner* — Christopher R Legendre

(57) ABSTRACT

A rotary manifold for a rotor assembly of a cohesion-type drive includes a manifold body extending along a drive axis for rotation thereabout, a first ductwork internal the body for fluid communication with a plurality of first chambers of the drive, and a second ductwork internal the body for fluid communication with a plurality of second chambers of the drive. The second ductwork is in fluid isolation of the first ductwork.

19 Claims, 13 Drawing Sheets

(56) References Cited

U.S. PATENT DOCUMENTS

| | | | |
|---|---|---|---|
| 4,218,177 | A | 8/1980 | Robel |
| 4,534,699 | A | 8/1985 | Possell |
| 6,135,708 | A | 10/2000 | Conrad et al. |
| 7,241,106 | B2 | 7/2007 | Avina |
| 9,732,619 | B2 * | 8/2017 | Wilson ................. F01D 5/3015 |
| 9,759,067 | B2 | 9/2017 | Tepic |
| 10,794,239 | B2 | 10/2020 | McGuire |
| 11,572,788 | B2 * | 2/2023 | McGuire ................... F01L 1/34 |
| 2005/0276681 | A1 | 12/2005 | Avina |
| 2006/0216149 | A1 | 9/2006 | Wilson |
| 2020/0355078 | A1 | 11/2020 | McGuire |

* cited by examiner

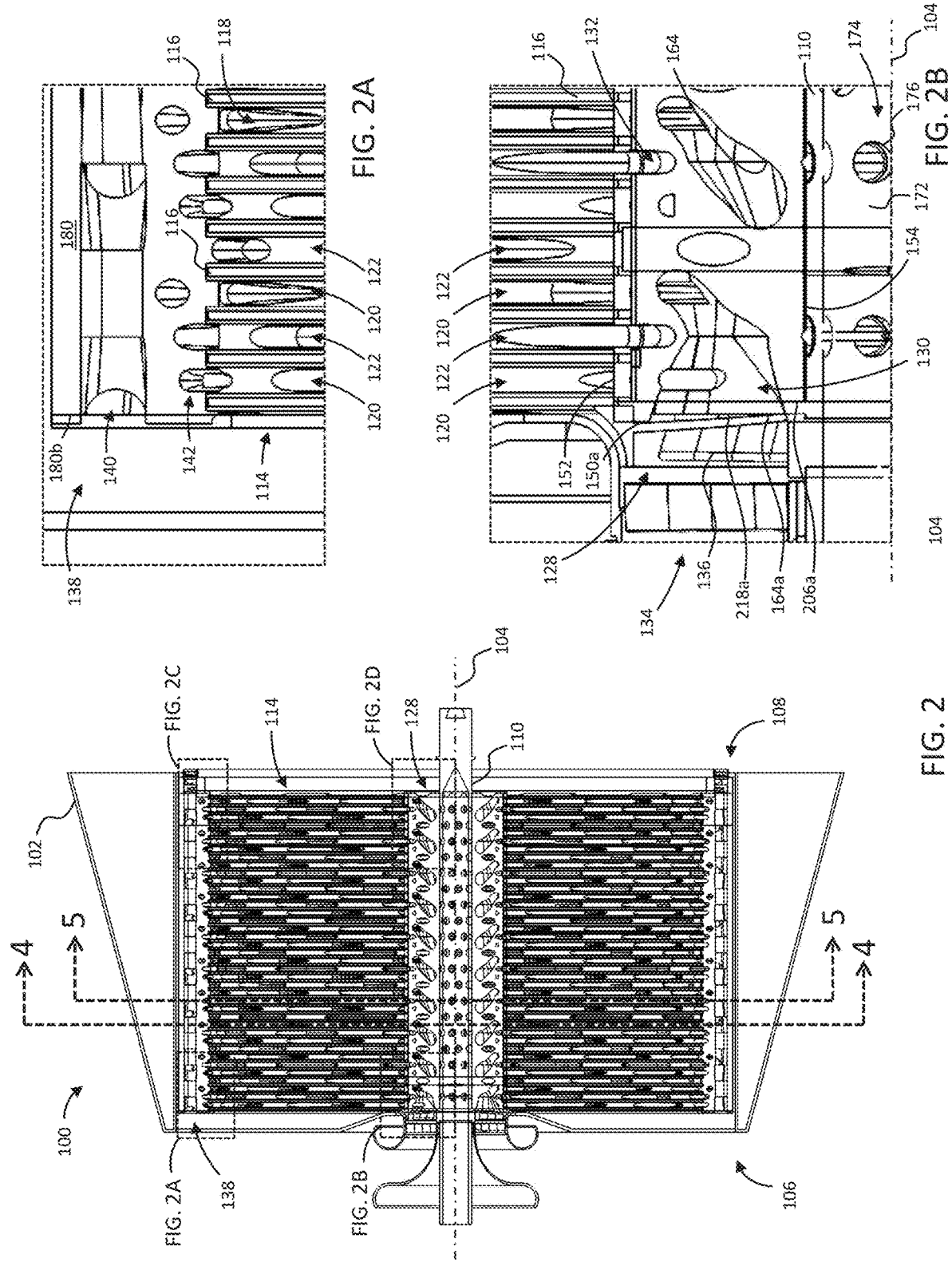

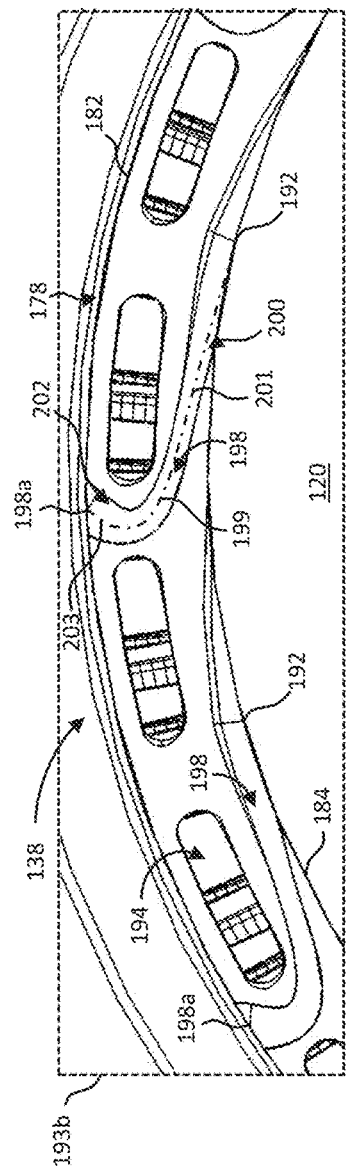
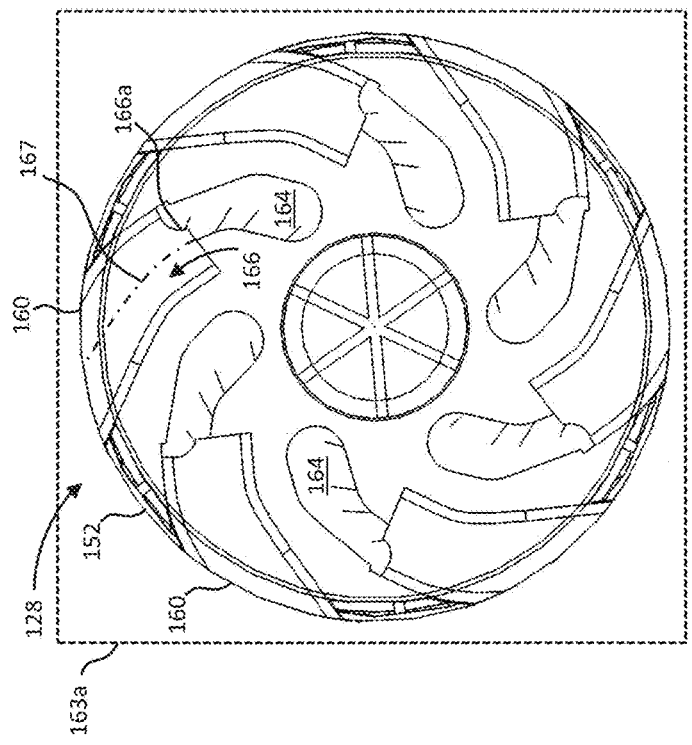
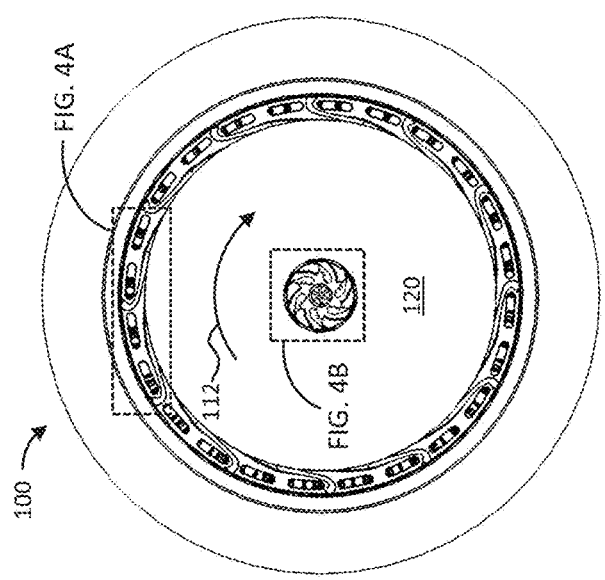
FIG. 4A
FIG. 4B
FIG. 4

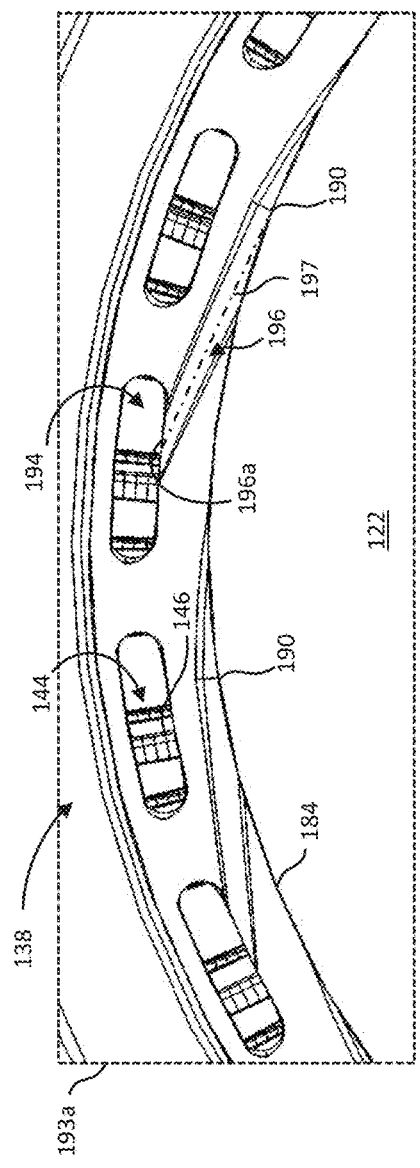
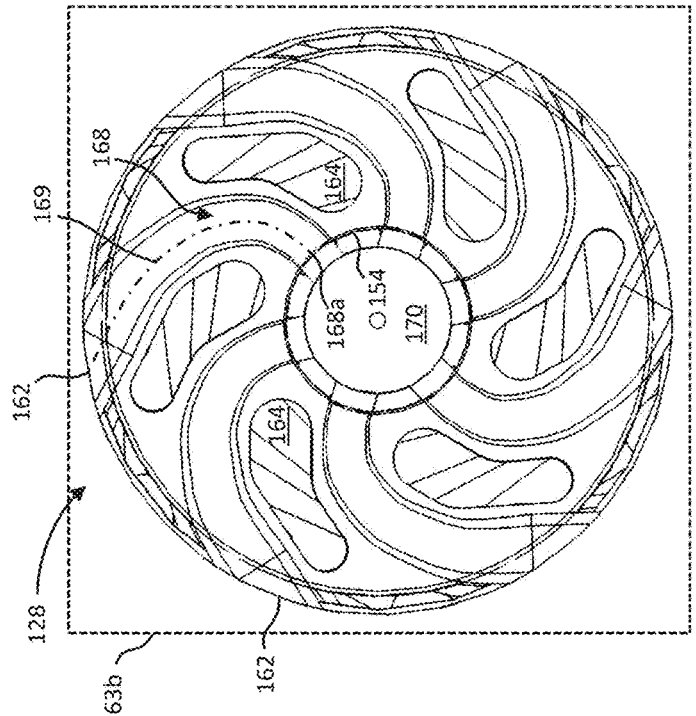
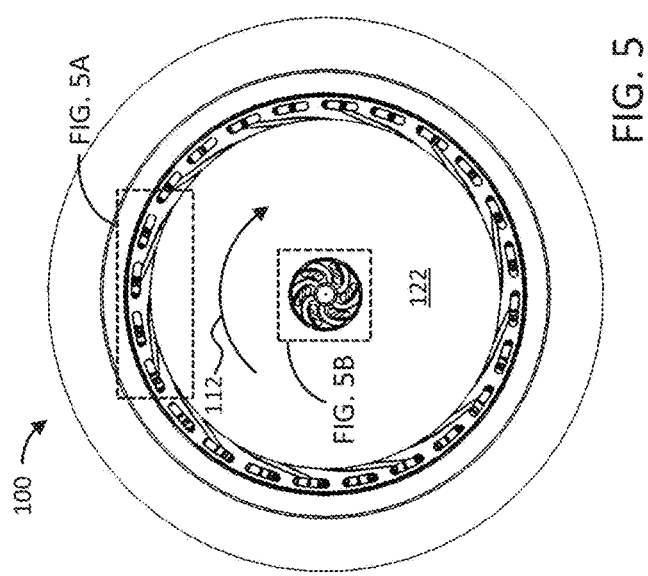

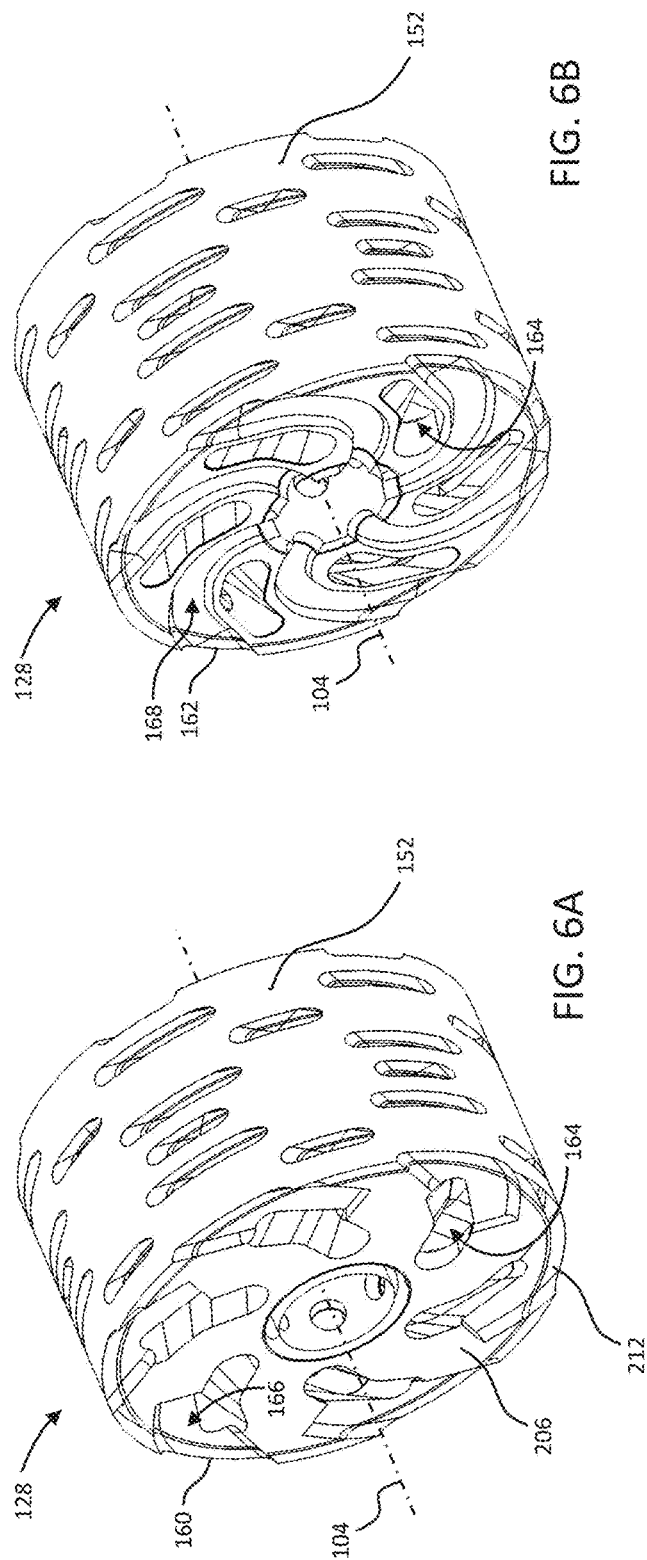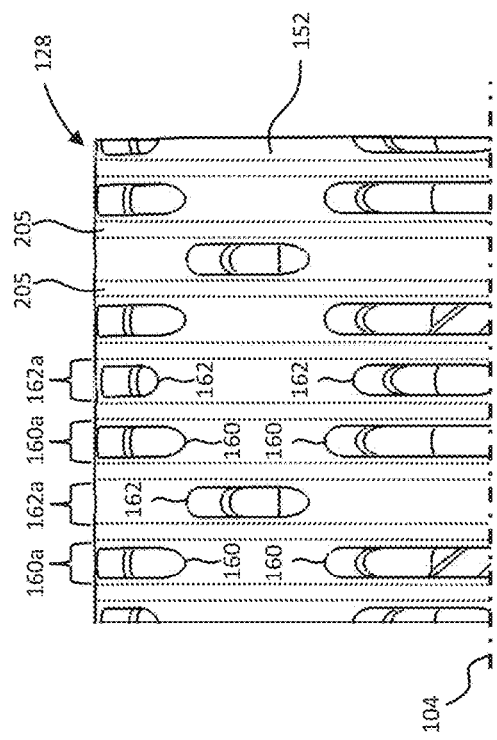
FIG. 6A
FIG. 6B
FIG. 6C

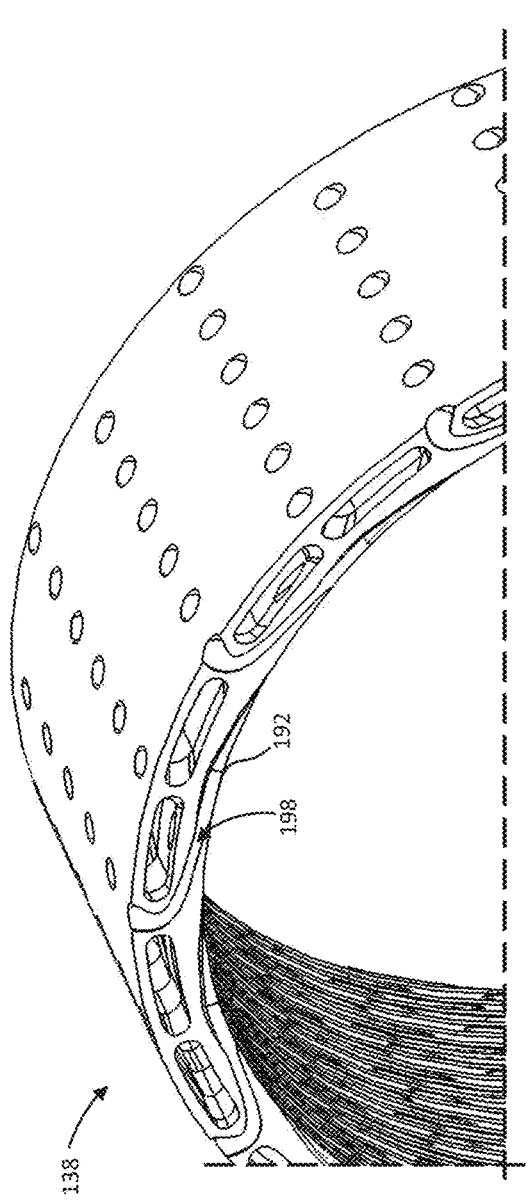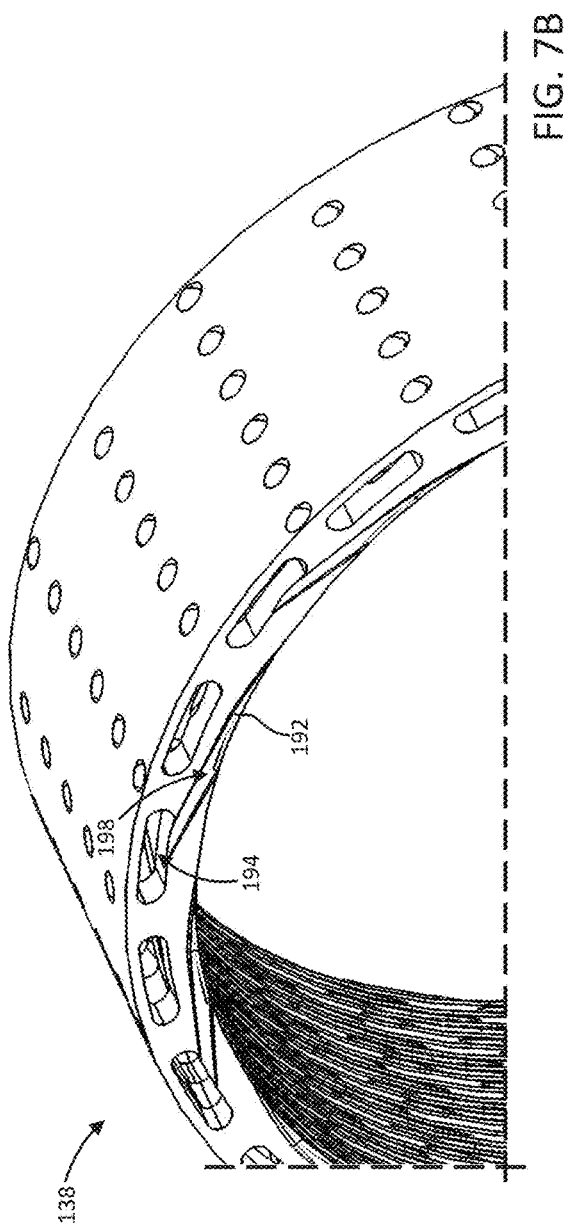

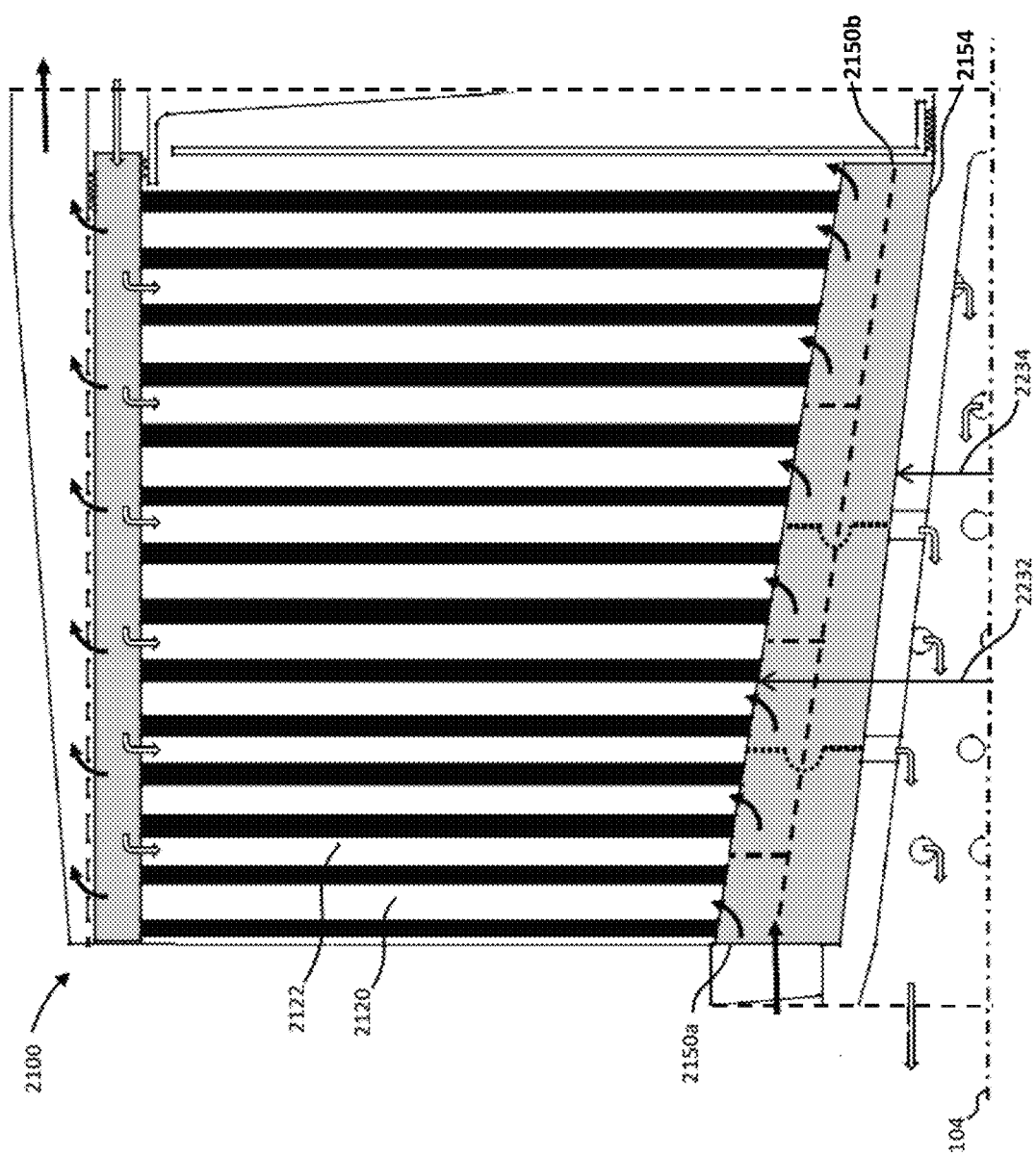

ROTARY MANIFOLD FOR A
COHESION-TYPE DRIVE

CROSS-REFERENCE TO RELATED
APPLICATIONS

This application is a continuation of U.S. application Ser. No. 16/943,683, filed Jul. 30, 2020, which is a divisional of U.S. patent application Ser. No. 15/821,808, filed on Nov. 23, 2017, and issued as U.S. Pat. No. 10,794,239, which claims the benefit of U.S. Provisional Application No. 62/426,109, filed on Nov. 23, 2016 and of U.S. Provisional Application No. 62/426,122, filed on Nov. 23, 2016, each of which is hereby incorporated herein by reference in its entirety.

FIELD

The disclosure relates to cohesion-type drives. More specifically, the disclosure relates to manifolds for rotor assemblies of cohesion-type drives.

BACKGROUND

U.S. Pat. No. 3,899,875 (Oklejas et al.) discloses a gas turbine. The turbine comprises a casing and a rotor mounted on bearings within the casing. The rotor is of a Tesla-type configuration. Means are provided on the rotor to conduct cooling air to alternate spaces between sets of disc-like blades of the rotor and to conduct a working fluid to opposite alternate spaces between the blades. The air cools the blades and is correspondingly heated. A collecting chamber receives the heated air and conducts it ultimately to a combustion chamber.

U.S. Pat. No. 3,999,377 (Oklejas et al.) discloses a tesla-type turbine including turbine blade cooling means. The turbine blades define a plurality of alternate spaces, with an air-conducting cooling space positioned between each pair of turbine or working spaces. While hot working gas expands between blades in the turbine spaces, cooling air flows in the opposite direction in the adjacent cooling spaces to cool the turbine blades. The disclosed turbine construction provides for axial air inflow and radial air outflow, with axial exhaust of working gas. After being heated by contact with the turbine blades, the cooling air is utilized in the combustion chamber of the turbine.

U.S. Pat. No. 3,007,311 (Amero) discloses an apparatus including a plurality of spaced discs coaxially positioned on a hub and secured against rotation about the hub, such discs defining a series of spaces extending along the hub, and a pair of isolated passageways axially disposed in the hub having alternate radial communication with the series of spaces, one of such passageways constituting an intake manifold and the other of such passageways constituting the exhaust manifold.

SUMMARY

The following summary is intended to introduce the reader to various aspects of the applicant's teaching, but not to define any invention.

According to some aspects, a cohesion-type drive includes (a) a casing; (b) a shaft rotatably supported in the casing for rotation about a drive axis in a circumferential forward direction; and (c) a disc pack supported in the casing coaxial with the shaft and fixed to rotate therewith. The disc pack includes a plurality of discs spaced axially apart from one another by disc spaces. The disc spaces include a plurality of compression chambers and a plurality of turbine chambers, with the turbine chambers alternating axially with and in fluid isolation of the compression chambers. The drive further includes (d) a hub manifold in the casing radially inward of the disc pack and fixed to rotate with the shaft about the drive axis. The hub manifold includes a hub body coaxial with the drive axis, a compression chamber inlet ductwork internal the hub body and in fluid communication with the compression chambers for conducting a first fluid into the compression chambers to compress the first fluid during rotation of the disc pack in the forward direction, and a turbine chamber outlet ductwork internal the hub body and in fluid communication with the turbine chambers for evacuating a second fluid from the turbine chambers. The turbine chamber outlet ductwork is in fluid isolation of the compression chamber inlet ductwork. The drive further includes a shroud manifold in the casing radially outward of the disc pack. The shroud manifold includes a compression chamber outlet ductwork in fluid communication with the compression chambers for evacuating the first fluid from the compression chambers, and a turbine chamber inlet ductwork in fluid communication with the turbine chambers for conducting the second fluid into the turbine chambers to urge rotation of the disc pack in the forward direction. The turbine chamber inlet ductwork in fluid isolation of the compression chamber outlet ductwork.

In some examples, the hub body includes a body first endface, a body second endface axially opposite the body first endface, and a body outer surface extending between the body first and second endfaces and directed radially outwardly toward the disc pack. The disc spaces are bounded radially by the body outer surface. The compression chamber inlet ductwork includes a plurality of compression chamber inlet ports open to the body outer surface for discharging the first fluid from the compression chamber inlet ductwork into the compression chambers, and the turbine chamber outlet ductwork includes a plurality of turbine chamber outlet ports open to the body outer surface for evacuating the second fluid from the turbine chambers and into the turbine chamber outlet ductwork.

In some examples, the compression chamber inlet ductwork includes a plurality of circumferentially spaced apart headers in fluid communication with the compression chamber inlet ports. Each header extends along a header centerline between a header first end open to the body first endface for receiving the first fluid and a header second end spaced axially apart from the header first end toward the body second endface.

In some examples, the header centerline extends helically about the drive axis in the circumferential forward direction from the header first end to the header second end.

In some examples, each header has a cross sectional area perpendicular to the drive axis, and the cross-sectional area of each header decreases along the header centerline from the header first end toward the header second end.

In some examples, the hub manifold includes a plurality of aerodynamic features extending at least partially across the header first ends and fixed to rotate with the hub body for conditioning flow of the first fluid entering the header first ends. In some examples, the aerodynamic features comprise circumferentially spaced apart airfoils extending radially across respective header first ends.

In some examples, the compression chamber inlet ductwork includes a plurality of inlet conduits for conducting the first fluid from the headers to the compression chamber inlet ports, and each inlet conduit extends along an inlet conduit centerline between a respective compression chamber inlet port and an inlet conduit intake end open to a respective header.

In some examples, the inlet conduit centerline curves circumferentially between the chamber inlet port and the inlet conduit intake end. In some examples, the inlet conduit centerline extends from the inlet conduit intake end to the compression chamber inlet port in a circumferential reverse direction opposite the forward direction for directing fluid passing radially outwardly through the inlet conduit and into a respective compression chamber in the reverse direction.

In some examples, the hub body includes a body inner surface radially opposite the body outer surface, and a manifold bore coaxial with the drive axis and bounded radially by the body inner surface. In some examples, the turbine chamber outlet ductwork includes a plurality of outlet conduits for conducting the second fluid from the turbine chamber outlet ports to a fluid evacuation space provided in the manifold bore. Each outlet conduit extends along an outlet conduit centerline between a respective turbine chamber outlet port and an outlet conduit discharge end open to the body inner surface and in fluid communication with the evacuation space.

In some examples, the outlet conduit centerline curves circumferentially between the turbine chamber outlet port and the outlet conduit discharge end. In some examples, the outlet conduit centerline extends from the turbine chamber outlet port to the outlet conduit discharge end in the circumferential forward direction for directing the second fluid passing radially inwardly through the outlet conduit in the forward direction.

In some examples, compression chamber inlet ports are arranged in axially spaced apart inlet sets, and the compression chamber inlet ports in each set are spaced circumferentially apart from one another about the drive axis and open to a respective compression chamber. In some examples, the turbine chamber outlet ports are arranged in axially spaced apart outlet sets alternating axially with the inlet sets, and the turbine chamber outlet ports in each set are spaced circumferentially apart from one another about the drive axis and open to a respective turbine chamber.

In some examples, the hub manifold includes a plurality of axially spaced apart circumferential grooves in the hub body outer surface, each groove receiving a radially inner peripheral edge of a respective disc.

In some examples, the body outer surface is spaced radially apart from the drive axis by a radius, the radius decreasing along the drive axis from the body first endface to the body second endface.

In some examples, the hub body includes a core coaxial with the drive axis and through which at least a portion of the compression chamber inlet ductwork and the turbine chamber outlet ductwork passes, and a frame mounted to the core for exerting an inwardly directed force on the core to regulate a stress distribution therein during operation.

In some examples, the core has a radially outwardly directed core outer surface, and the frame includes an outer sleeve mounted over the core and in engagement with the core outer surface for inducing radial compression of the core during operation.

In some examples, the core includes a radially inwardly directed core inner surface radially opposite the core outer surface, and a core bore coaxial with the drive axis and bounded radially by the core inner surface, and the frame includes an inner sleeve in the core bore and in engagement with the core inner surface. The inner and outer sleeves are anchored to one another for inducing radial compression of the core during operation.

In some examples, the core has a core first endface and a core second endface axially opposite the core first endface, and the frame includes a first end cap in engagement with the core first endface and a second end cap in engagement with the core second endface. The first and second end caps are anchored to one another for inducing axial compression of the core during operation.

In some examples, at least a portion of the hub body is formed of a thermally conductive material for conductively transferring heat between the first fluid passing through the compression chamber inlet ductwork and the second fluid passing through the turbine chamber outlet ductwork.

In some examples, the shroud manifold is fixed to rotate with the shaft about the drive axis, and includes a shroud body coaxial with the drive axis, and the turbine chamber inlet ductwork and the compression chamber outlet ductwork are internal the shroud body.

According to some aspects, a cohesion-type drive includes (a) a casing; (b) a shaft rotatably supported in the casing for rotation about a drive axis in a circumferential forward direction; and (c) a disc pack supported in the casing coaxial with the shaft and fixed to rotate therewith. The disc pack includes a plurality of discs spaced axially apart from one another by disc spaces. The disc spaces comprise a plurality of compression chambers and a plurality of turbine chambers, with the turbine chambers alternating axially with and in fluid isolation of the compression chambers. The drive further includes (d) a hub manifold in the casing radially inward of the disc pack. The hub manifold includes a compression chamber inlet ductwork in fluid communication with the compression chambers for conducting a first fluid into the compression chambers to compress the first fluid during rotation of the disc pack in the forward direction, and a turbine chamber outlet ductwork in fluid communication with the turbine chambers for evacuating a second fluid from the turbine chambers. The turbine chamber outlet ductwork is in fluid isolation of the compression chamber inlet ductwork. The drive further includes (e) a shroud manifold in the casing radially outward of the disc pack and fixed to rotate with the shaft about the drive axis. The shroud manifold includes: a shroud body coaxial with the drive axis, a compression chamber outlet ductwork internal the shroud body and in fluid communication with the compression chambers for evacuating the first fluid from the compression chambers, and a turbine chamber inlet ductwork internal the shroud body and in fluid communication with the turbine chambers for conducting the second fluid into the turbine chambers to urge rotation of the disc pack in the forward direction. The turbine chamber inlet ductwork is in fluid isolation of the compression chamber outlet ductwork.

In some examples, the shroud body includes a body first endface, a body second endface axially opposite the body first endface, and a body inner surface extending between the first and second endfaces and directed radially inwardly toward the disc pack. The disc spaces are bounded radially by the body inner surface. The compression chamber outlet ductwork includes a plurality of compression chamber outlet ports open to the body inner surface for evacuating the first fluid from the compression chambers and into the compression chamber inlet ductwork, and the turbine chamber inlet ductwork includes a plurality of turbine chamber inlet ports open to the body inner surface for discharging the second fluid from the turbine chamber outlet ductwork and into the turbine chambers to urge rotation of the disc pack in the forward direction.

In some examples, the turbine chamber inlet ductwork includes a plurality of circumferentially spaced apart headers in fluid communication with the turbine chamber inlet ports. Each header extends between a header first end open to the body first endface for receiving the second fluid and a header second end spaced axially apart from the header first end toward the body second endface.

In some examples, the shroud manifold includes a plurality of aerodynamic features extending at least partially across the header first ends and fixed to rotate with the shroud body for conditioning flow of the second fluid entering the headers.

In some examples, the aerodynamic features include circumferentially spaced apart airfoils extending radially across respective header first ends.

In some examples, the turbine chamber inlet ductwork includes a plurality of inlet conduits for conducting the second fluid from the headers to the turbine chamber inlet ports, and each inlet conduit extends along an inlet conduit centerline between a respective turbine chamber inlet port and an inlet conduit intake end open to a respective header.

In some examples, the inlet conduit centerline curves circumferentially between the turbine chamber inlet port and the inlet conduit intake end. In some examples, the inlet conduit centerline extends from the inlet conduit intake end to the turbine chamber inlet port in the circumferential forward direction for directing fluid passing radially inwardly through the inlet conduit and into the turbine chamber in the forward direction.

In some examples, the shroud body has a body outer surface radially opposite the body inner surface, and the drive includes a fluid evacuation space in the casing radially intermediate the shroud manifold and an inner surface of the casing and bounded radially by the body outer surface for evacuating the first fluid. The compression chamber outlet ductwork includes a plurality of outlet conduits for conducting the first fluid from the compression chamber outlet ports to the evacuation space, and each outlet conduit extends along an outlet conduit centerline between a respective compression chamber outlet port and an outlet conduit discharge end open to the body outer surface and in fluid communication with the evacuation space.

In some examples, the outlet conduit centerline curves circumferentially between the compression chamber outlet port and the outlet conduit discharge end. In some examples, the outlet conduit includes an intake portion extending along an intake portion centerline from the compression chamber outlet port toward the outlet conduit discharge end. The intake portion centerline extends from the compression chamber outlet port toward the outlet conduit discharge end in a circumferential reverse direction opposite the forward direction for directing the first fluid entering and passing radially outwardly through the intake portion in the reverse direction.

In some examples, the outlet conduit includes a discharge portion extending along a discharge portion centerline from the intake portion to the outlet conduit discharge end, the discharge portion centerline extending from the intake portion to the outlet conduit discharge end in one of the circumferential forward direction and the reverse direction for directing the first fluid passing radially outwardly through the discharge portion and into the evacuation space in the one of the forward and reverse direction.

In some examples, the turbine chamber inlet ports are arranged in axially spaced apart inlet sets. The turbine chamber inlet ports in each set are spaced circumferentially apart from one another about the drive axis and open to a respective turbine chamber. The compression chamber outlet ports are arranged in axially spaced apart outlet sets alternating axially with the inlet sets. The compression chamber outlet ports in each set are spaced circumferentially apart from one another about the drive axis and open to a respective compression chamber.

In some examples, the shroud manifold includes a plurality of axially spaced apart circumferential grooves in the shroud body inner surface, each groove receiving a radially outer peripheral edge of a respective disc.

According to some aspects, a manifold for a rotor assembly of a cohesion-type drive includes (a) a manifold body extending along a drive axis for rotation thereabout in a circumferential first direction, (b) a first ductwork internal the body for fluid communication with a plurality of first chambers of the drive, and (c) a second ductwork internal the body for fluid communication with a plurality of second chambers of the drive, the second ductwork in fluid isolation of the first ductwork.

In some examples, the body includes a first endface, a second endface axially opposite the first endface, a radially outwardly directed body outer surface extending between the first and second endfaces, a radially inwardly directed body inner surface radially opposite the body outer surface and extending between the first and second endfaces, and a manifold bore in the body coaxial with the drive axis and bounded radially by the body inner surface.

In some examples, the first ductwork includes a plurality of first ports open to one of the body inner surface and the body outer surface for conducting fluid between the first ductwork and the first chambers. In some examples, the first ports are arranged in a plurality of axially spaced apart first sets, and each first set is arranged for fluid communication with a respective first chamber.

In some examples, the second ductwork includes a plurality of second ports open to the one of the body inner surface and the body outer surface for conducting fluid between the second ductwork and the second chambers. In some examples, the second ports are arranged in a plurality of axially spaced apart second sets, and the second sets alternate axially with the first sets. Each second set is arranged for fluid communication with a respective second chamber.

In some examples, the first ports in each set are spaced circumferentially apart from one another about the drive axis, and the second ports in each set are spaced circumferentially apart from one another about the drive axis.

In some examples, the first ports in each set lie in a common first plane oriented normal to the drive axis, and the second ports in each set lie in a common second plane oriented normal to the drive axis.

In some examples, the first ductwork includes a plurality of circumferentially spaced apart headers in fluid communication with the first ports. Each header extends along a header centerline between a header first end open to the body first endface for receiving fluid and a header second end spaced axially apart from the header first end toward the body second endface.

In some examples, the header centerline extends helically about the drive axis in the circumferential first direction from the header first end to the header second end.

In some examples, each header has a cross sectional area perpendicular to the drive axis. The cross-sectional area of each header decreases along the header centerline from the header first end toward the header second end.

In some examples, the manifold includes a plurality of aerodynamic features extending at least partially across the header first ends and fixed to rotate with the body for conditioning flow of fluid entering the header first ends.

In some examples, the aerodynamic features comprise circumferentially spaced apart airfoils extending radially across respective header first ends.

In some examples, the first ductwork includes a plurality of first conduits for conducting fluid between the headers and the first ports. Each first conduit extends along a first conduit centerline between a respective first port and a first conduit end open to a respective header. In some examples, the first conduit centerline curves circumferentially between the first port and the first conduit end.

In some examples, the first ports are open to the body outer surface and spaced radially outwardly from the first conduit ends, and each first conduit centerline extends radially outwardly and in a circumferential second direction opposite the first direction from a respective first conduit end to a respective first port for directing fluid passing radially outwardly through the first conduit in the second direction.

In some examples, the first ports are open to the body inner surface and spaced radially inwardly from the first conduit ends, and each first conduit centerline extends radially inwardly and in the circumferential first direction from a respective first conduit end to a respective first port for directing fluid passing radially inwardly through the first conduit in the first direction.

In some examples, the second ductwork includes a plurality of second conduits. Each second conduit extends along a second conduit centerline between a respective second port and a second conduit end open to the other one of the body inner surface and the body outer surface. In some examples, the second conduits curve circumferentially between the second port and the second conduit end.

In some examples, the second ports are open to the body outer surface and the second conduit ends are open to the body inner surface, and wherein each second conduit centerline extends radially inwardly and in the circumferential first direction from a respective second port to a respective second conduit end for directing fluid passing radially inwardly through the second conduit in the first direction.

In some examples, the second ports are open to the body inner surface and the second conduit ends are open to the body outer surface, and each second conduit includes an intake portion extending along an intake portion centerline from a respective second port toward a respective second conduit end. The intake portion centerline extends radially outwardly and in a circumferential second direction opposite the first direction from the second port toward the conduit second end for directing fluid passing radially outwardly through the intake portion in the second direction.

In some examples, the second conduit includes a discharge portion extending along a discharge portion centerline from the intake portion to the second conduit end. The discharge portion centerline extends radially outwardly and in one of the circumferential first direction and the second direction from the intake portion to the conduit second end for directing fluid passing radially outwardly through the discharge portion and out the conduit second end in the one of the first direction and the second direction.

In some examples, the manifold includes a plurality of axially spaced apart circumferential grooves in the one of the body inner surface and the body outer surface for mounting a plurality of discs of the drive. Each groove is axially intermediate a respective first set of first ports and a respective axially adjacent second set of second ports, and each groove configured for receiving a peripheral edge of a respective disc.

In some examples, the manifold includes an interference structure for engagement with a disc pack to rotationally lock the disc pack with the manifold.

In some examples, the body outer surface is spaced radially apart from the drive axis by a radius, and the radius decreases along the drive axis from the body first endface to the body second endface.

In some examples, the body includes a core coaxial with the drive axis and through which at least a portion of the first ductwork and the second ductwork passes, and a frame mounted to the core for exerting an inwardly directed force on the core to regulate a stress distribution therein during operation.

In some examples, the core has a radially outwardly directed core outer surface, and the frame includes an outer sleeve mounted over the core and in engagement with the core outer surface for inducing radial compression of the core during operation.

In some examples, the body includes a core bore in the core coaxial with the drive axis and bounded by a radially inwardly directed core inner surface of the core, and the frame includes an inner sleeve in the core bore and in engagement with the core inner surface. The inner and outer sleeves are anchored to one another for inducing radial compression of the core during operation.

In some examples, the core has a core first endface and a core second endface axially opposite the core first endface, and the frame includes a first end cap in engagement with the core first endface and a second end cap in engagement with the core second endface. The first and second end caps anchored to one another for inducing axial compression of the core during operation.

In some examples, at least a portion of the body is formed of a thermally conductive material for transferring heat between fluid passing through the first ductwork and fluid passing through the second ductwork.

According to some aspects, a manifold for a rotor assembly of a cohesion-type drive includes (a) a manifold body extending along a drive axis for rotation thereabout, and (b) ductwork internal the body for fluid communication with a plurality of working chambers of the drive.

In some examples, the body includes a first endface, a second endface axially opposite the first endface, a radially outwardly directed body outer surface extending between the first and second endfaces, a radially inwardly directed body inner surface radially opposite the body outer surface and extending between the first and second endfaces, and a manifold bore in the body coaxial with the drive axis and bounded radially by the body inner surface.

In some examples, the ductwork includes a plurality of ports open to one of the body inner surface and the body outer surface for conducting fluid between the ductwork and the chambers. In some examples, the ports are arranged in a plurality of axially spaced apart sets, and each set is arranged for fluid communication with a respective chamber.

In some examples, the manifold comprises a shroud manifold for positioning radially outward of a disc pack of the drive, and the ports are open to the body inner surface.

In some examples, the manifold comprises a hub manifold for positioning radially inward of a disc pack of the drive, and the ports are open to the body outer surface.

In some examples, the ductwork includes a plurality of conduits, each conduit extending between a respective port and a conduit end. In some examples, the conduits are curved circumferentially between the port and the conduit end.

In some examples, the ductwork includes a plurality of headers extending into the body from the first endface and in fluid communication with the ports. The headers are spaced circumferentially apart from one another about the drive axis.

According to some aspects, a manifold for a rotor assembly of a cohesion-type drive includes: (a) a manifold body extending along a drive axis for rotation thereabout. The body includes a core coaxial with the drive axis, and a frame mounted to the core for exerting an inwardly directed force on the core to regulate a stress distribution therein during operation of the drive. The manifold further includes (b) a first ductwork internal the body for fluid communication with a plurality of working chambers of the drive. At least a portion of the ductwork passes through the core.

In some examples, the core has a radially outwardly directed core outer surface, and the frame includes an outer sleeve mounted over the core and in engagement with the core outer surface for inducing radial compression of the core during operation.

In some examples, the body includes a core bore in the core coaxial with the drive axis and bounded by a radially inwardly directed core inner surface of the core, and the frame includes an inner sleeve in the core bore and in engagement with the core inner surface. The inner and outer sleeves are anchored to one another for inducing radial compression of the core during operation.

In some examples, the frame includes a plurality of anchors anchoring the inner and outer sleeves to one another. Each anchor extends between an anchor outer end fixed to the outer sleeve and an anchor inner end fixed to the inner sleeve.

In some examples, the manifold body includes a plurality of apertures passing radially through the core between the core inner and outer surfaces, and the anchors extend through respective apertures.

In some examples, the core has a core first endface and a core second endface axially opposite the core first endface, and the frame includes a first end cap in engagement with the core first endface and a second end cap in engagement with the core second endface. The first and second end caps are anchored to one another for inducing axial compression of the core during operation.

In some examples, the frame includes a disc pack mounting portion for engagement with the disc pack to fix the disc pack to the frame, a shaft mounting portion spaced radially inwardly from the disc pack mounting portion for engagement with the shaft to fix the shaft to the frame, and one or more torque-transfer members for transferring torque between the disc pack mounting portion and the shaft mounting portion. Each torque-transfer member has a radially outer end fixed to the disc pack mounting portion and a radially inner end fixed to the shaft mounting portion.

BRIEF DESCRIPTION OF THE DRAWINGS

The drawings included herewith are for illustrating various examples of apparatuses and methods of the present specification and are not intended to limit the scope of what is taught in any way. In the drawings:

FIG. 2 is a cross-sectional view of portions of the drive of FIG. 1, taken along line 2-2 of FIG. 1;

FIG. 2A is an enlarged portion of FIG. 2, showing front portions of a shroud manifold of the drive of FIG. 1;

FIG. 2B is another enlarged portion of FIG. 2, showing front portions of a hub manifold of the drive of FIG. 1;

FIG. 4 is a cross-sectional view of portions of the drive of FIG. 1, taken along line 4-4 of FIG. 2;

FIG. 4A is an enlarged portion of FIG. 4, showing a portion of the shroud manifold;

FIG. 4B is another enlarged portion of FIG. 4, showing the hub manifold;

FIG. 5 is a cross-sectional view of portions of the drive of FIG. 1, taken along line 5-5 of FIG. 2;

FIG. 5A is an enlarged portion of FIG. 5, showing a portion of the shroud manifold;

FIG. 5B is another enlarged portion of FIG. 5, showing the hub manifold;

FIG. 6A is a front perspective cut-away view of a portion of the hub manifold, showing an internal hub ductwork arrangement of the hub manifold;

FIG. 6B is a front perspective cut-away view of another portion of the hub manifold, showing another internal hub ductwork arrangement of the hub manifold;

FIG. 6C is a side view of an upper portion of the hub manifold;

FIG. 7A is a front perspective cut-away view of a portion of the shroud manifold, showing an internal shroud ductwork arrangement of the shroud manifold;

FIG. 7B is a front perspective cut-away view of another portion of the shroud manifold, showing another internal shroud ductwork arrangement of the shroud manifold;

FIG. 10 is a simplified schematic representation of portions of another cohesion-type drive;

DETAILED DESCRIPTION

Figure 1:
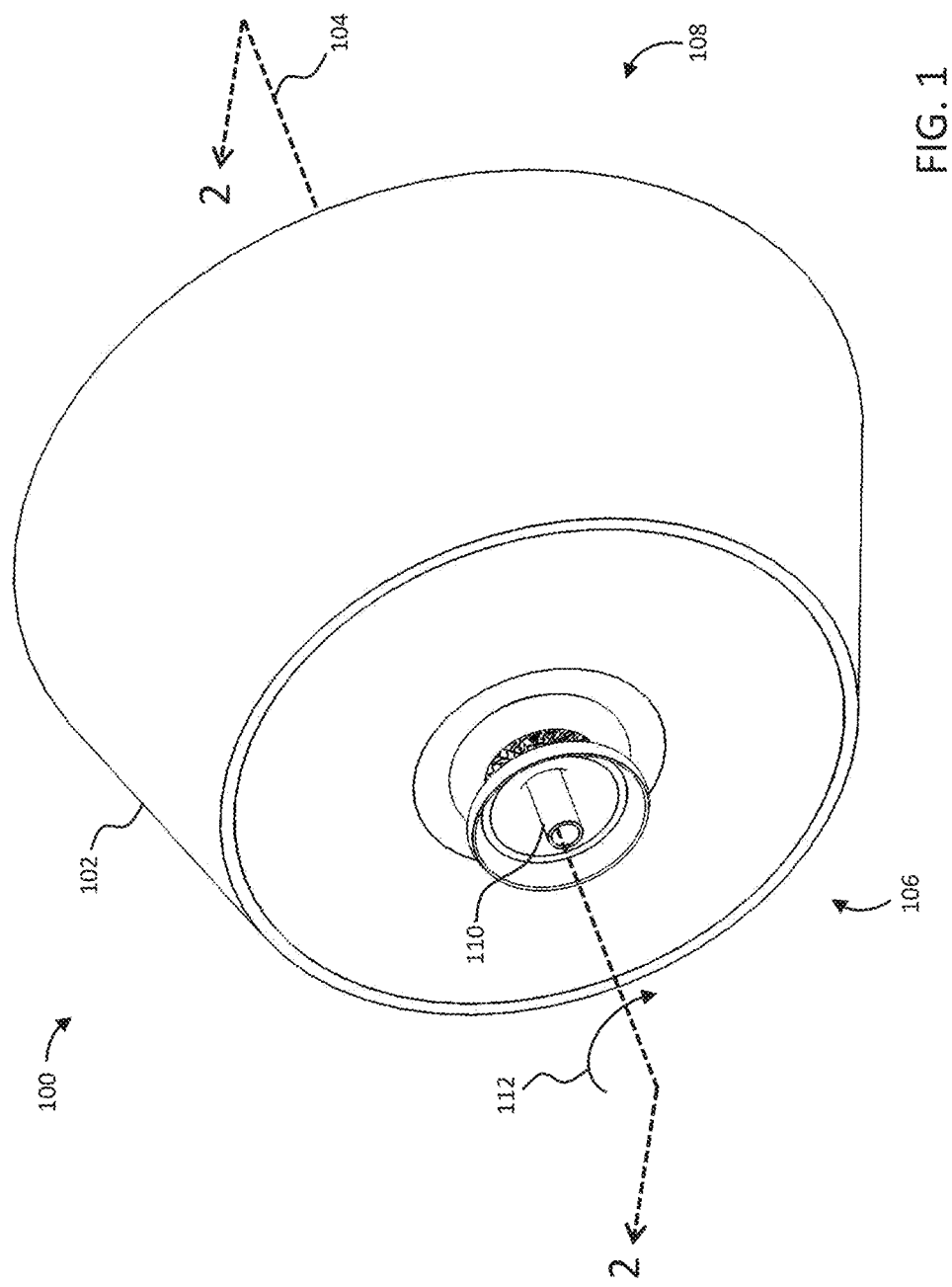
FIG. 1 is a front perspective view of an example cohesion-type drive.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

A cohesion-type drive includes a casing, a shaft rotatably supported in the casing for rotation about a drive axis, and a disc pack coaxial with the shaft and fixed to rotate therewith. The disc pack includes a plurality of coaxial discs that are spaced axially apart from one another by disc spaces forming a plurality of working chambers. Typical disc packs include annular discs, but some designs can include conical discs, reverse flow discs, hybrid discs, etc.

In pump or compressor applications, the shaft is driven to rotate the discs and a fluid is conducted into a radially inner portion of the chambers. The rotating discs impart work on the fluid and the fluid is urged radially outwardly. In turbine applications, a fluid is discharged into a radially outer portion of the chambers. The fluid imparts work on the discs to drive rotation of the shaft in the circumferential direction and flows through the chambers radially inwardly.

In some examples, the disc spaces can include a plurality of first chambers and a plurality of second chambers alternating axially with the first chambers. The first and second chambers can be in fluid isolation of one another. A first fluid can be conducted into the first chambers and a second fluid different from the first fluid can be conducted into the second chambers.

In some examples, the first chambers can comprise one of compression chambers and turbine chambers, and the second chambers can comprise the other one of compression chambers and turbine chambers. In such examples, the cohesion-type drive can operate as a regenerator in combination with a fluid power device. For example, the first chambers can comprise compression chambers and a first fluid can be conducted into a radially inner portion of the compression chambers for compression thereof. The second chambers can comprise turbine chambers and a second fluid can be discharged into a radially outer portion of the second chambers to impart work on the disc pack for urging rotation of the shaft. The work imparted on the disc pack by the second fluid can be greater than the work extracted from the disc pack by the first fluid, thereby generating a net work output. In such examples, the first fluid can include a relatively cool fluid, such as atmospheric air, and the second fluid can include a relatively hot fluid, such as combustion gases. This can facilitate regenerative heat exchange across the discs as the first and second fluids pass through respective chambers, and can help cool the discs.

In some examples, after compression, the first fluid can be evacuated from the first chambers and conducted to a combustion chamber. The first fluid can be mixed with fuel and the mixture can be combusted to generate the combustion gases for discharging into the second chambers.

Such cohesion-type drives as described above generally require manifolds to conduct working fluid into and/or out from the working chambers, and the manifold design can affect the performance of the drive. According to some aspects of the teachings disclosed herein, design improvements can advantageously be made to manifolds for such cohesion-type drives.

Referring to FIG. 1, an example cohesion type drive 100 is illustrated. The drive 100 includes a casing 102 extending along a drive axis 104 between a casing front end 106 and a casing rear end 108 spaced axially apart from the front end 106 in an axially rearward direction. A shaft 110 is rotatably supported in the casing 102 for rotation about the drive axis 104 in a circumferential first direction 112 (also referred to as forward direction 112).

Referring to FIG. 2, in the example illustrated, a disc pack 114 is supported in the casing 102 coaxial with the shaft 110 and is fixed to rotate therewith. Referring to FIG. 2A, the disc pack 114 includes a plurality of axially spaced apart discs 116. In the example illustrated, the discs 116 are generally annular.

Figure 3:
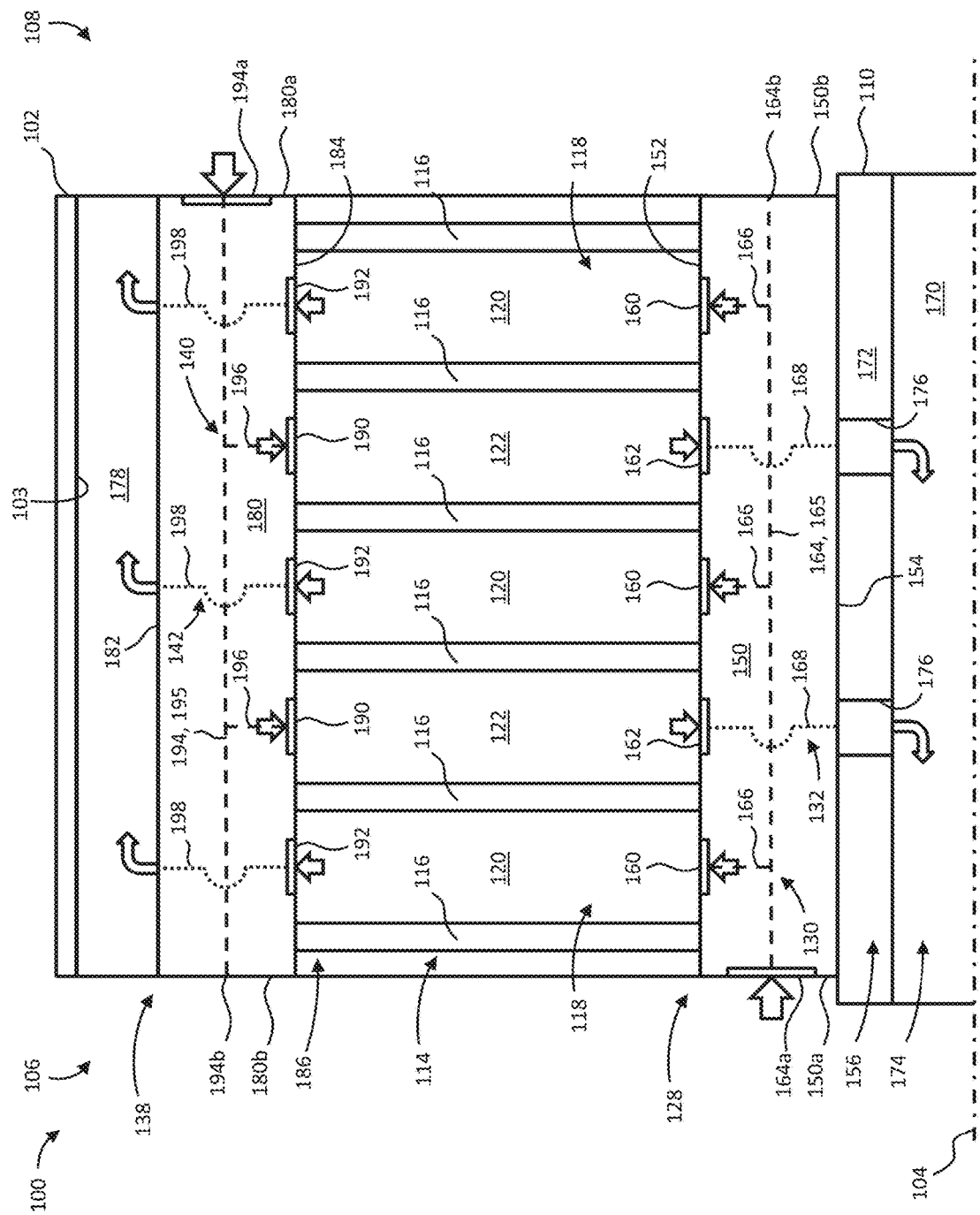
FIG. 3 is a simplified schematic representation of an upper half of FIG. 2.

Referring to FIG. 3, in the example illustrated, the discs 116 are spaced axially apart from one another by disc spaces 118. The disc spaces 118 define a plurality of compression chambers 120, and a plurality of turbine chambers 122 alternating axially with and in fluid isolation of the compression chambers 120.

Referring still to FIG. 3, in the example illustrated, the drive 100 further includes a first manifold 128 (also referred to as hub manifold 128 or bore manifold 128) in the casing 102 radially inward of the disc pack 114. The hub manifold 128 includes a hub first ductwork 130 (also referred to as compression chamber inlet ductwork 130) for fluid communication with the compression chambers 120. The compression chamber inlet ductwork 130 is in fluid communication with the compression chambers 120 for conducting a first fluid into the compression chambers 120 to compress the first fluid during rotation of the disc pack 114 in the forward direction 112. The first fluid can include, for example, air.

In the example illustrated, the hub manifold 128 includes a hub second ductwork 132 (also referred to as turbine chamber outlet ductwork 132) for fluid communication with the turbine chambers 122. In the example illustrated, the turbine chamber outlet ductwork 132 is in fluid communication with the turbine chambers 122 for evacuating a second fluid from the turbine chambers 122. In the example illustrated, the second fluid has a temperature greater than the first fluid, and can include, for example, combustion gases. In the example illustrated, the compression chamber inlet ductwork 130 and the turbine chamber outlet ductwork 132 are in fluid isolation of one another.

In the example illustrated, the drive 100 further includes a second manifold 138 (also referred to as shroud manifold 138) in the casing 102 radially outward of the disc pack 114. In the example illustrated, the shroud manifold 138 includes a shroud first ductwork 140 (also referred to as a turbine chamber inlet ductwork 140) in fluid communication with the turbine chambers 122. The turbine chamber inlet ductwork 140 is in fluid communication with the turbine chambers 122 for conducting the second fluid into the turbine chambers 122 to urge rotation of the disc pack 114 in the forward direction 112. In the example illustrated, the shroud manifold 138 further includes a shroud second ductwork 142 (also referred to as compression chamber outlet ductwork 142) in fluid communication with the compression chambers 120. The compression chamber outlet ductwork 142 is in fluid communication with the compression chambers 120 for evacuating the first fluid from the compression chambers 120. In the example illustrated, the turbine chamber inlet ductwork 140 and the compression chamber outlet ductwork 142 are in fluid isolation of one another.

At least one of the hub manifold and the shroud manifold can be fixed to rotate with the shaft about the drive axis. In the example illustrated, the hub manifold 128 is fixed to rotate with the shaft 110 about the drive axis 104, and forms part of the rotor assembly of the drive 100. The hub manifold 128 includes a hub body 150 coaxial with the drive axis, and each of the compression chamber inlet ductwork 130 and the turbine chamber outlet ductwork 132 are internal the hub body 150 (see also FIGS. 6A, 6B). Providing the ductwork internal the manifold body can allow for optimization of the ductwork geometry to, for example, help condition fluid flow, minimize fluid losses, accommodate fluid flow fields at the manifold interfaces, control flow distribution among the working chambers, and control heat transfer between fluids passing through the ductwork.

In the example illustrated, the hub body 150 is generally cylindrical. The hub body 150 includes a hub body first endface 150a and a hub body second endface 150b axially opposite the hub body first endface 150a. In the example illustrated, the hub body first endface 150a is located toward the casing front end 106, and the hub body second endface 150b is spaced apart from the hub body first endface 150a toward the casing rear end 108.

In the example illustrated, the hub body 150 includes a hub body outer surface 152 directed radially outwardly toward the disc pack 114 and extending axially between the hub body first and second endfaces 150a, 150b. In the example illustrated, the disc spaces 118 are bounded radially by the hub body outer surface 152. The hub body 150 includes a radially inwardly directed hub body inner surface 154 radially opposite the hub body outer surface 152 and extending axially between the hub body first and second endfaces 150a, 150b. In the example illustrated, the hub manifold 128 includes a hub manifold bore 156 in the hub body 150 coaxial with the drive axis 104, and bounded radially by the hub body inner surface 154.

In the example illustrated, the compression chamber inlet ductwork 130 includes a plurality of hub first ports 160 (also referred to as compression chamber inlet ports 160) open to the hub body outer surface 152 for discharging the first fluid from the compression chamber inlet ductwork 130 into the compression chambers 120. In the example illustrated, the turbine chamber outlet ductwork 132 includes a plurality of hub second ports 162 (also referred to as turbine chamber outlet ports 162) open to the hub body outer surface 152 for evacuating the second fluid from the turbine chambers 122 and into the turbine chamber outlet ductwork 132.

Referring to FIG. 6C, in the example illustrated, the compression chamber inlet ports 160 are arranged in axially spaced apart hub first sets 160a (also referred to as hub inlet sets 160a), with each set 160a of compression chamber inlet ports 160 open to a respective compression chamber 120. In the example illustrated, the turbine chamber outlet ports 162 are arranged in axially spaced apart hub second sets 162a (also referred to as hub outlet sets 162a), with each set 162a of turbine chamber outlet ports 162 open to a respective turbine chamber 122. In the example illustrated, the hub outlet sets 162a alternate axially with the hub inlet sets 160a.

Referring to FIG. 4B, in the example illustrated, the compression chamber inlet ports 160 in each set 160a are spaced circumferentially apart from one another about the drive axis 104. In the example illustrated, the compression chamber inlet ports 160 in each set 160a lie in a common hub first plane 163a oriented normal to the drive axis 104 (see also FIG. 6C). Referring to FIG. 5B, in the example illustrated, the turbine chamber outlet ports 162 in each set 162a are spaced circumferentially apart from one another about the drive axis 104. In the example illustrated, the turbine chamber outlet ports 162 in each set 162a lie in a common hub second plane 163b normal to the drive axis 104 (see also FIG. 6C).

Referring to FIG. 4B, in the example illustrated, the compression chamber inlet ductwork 130 includes a plurality of circumferentially spaced apart hub headers 164 in fluid communication with the compression chamber inlet ports 160. Referring to FIG. 3, each hub header 164 extends along a hub header centerline 165 between a hub header first end 164a open to the hub body first endface 150a for receiving the first fluid, and a hub header second end 164b spaced axially apart from the hub header first end 164a toward the hub body second endface 150b (see also FIGS. 2B and 4B).

Referring to FIG. 4B, in the example illustrated, the header centerline 165 extends helically about the drive axis 104 in the circumferential forward direction 112 from the header first end 164a to the header second end 164b. Referring to FIG. 2B, each header 164 has a cross sectional area perpendicular to the drive axis 104. In the example illustrated, the cross-sectional area of each header 164 decreases along the header centerline 165 from the header first end 164a toward the header second end 164b.

Referring still to FIG. 2B, in the example illustrated, the hub manifold 128 includes a plurality of hub aerodynamic features 134 (see also FIG. 8) extending at least partially across the header first ends 164a and fixed to rotate with the hub body 150 for conditioning flow of the first fluid entering the header first ends 164a. In the example illustrated, the aerodynamic features 134 comprise hub airfoils 136. In the example illustrated, the hub airfoils 136 are spaced circumferentially apart from one another about the drive axis 104 and extend radially across respective header first ends 164a (see also FIG. 8).

Referring to FIG. 3, in the example illustrated, the compression chamber inlet ductwork 130 includes a plurality of hub first conduits 166 (also referred to as hub inlet conduits 166) for conducting the first fluid from the hub headers 164 to the compression chamber inlet ports 160. Referring to FIG. 4B, each hub inlet conduit 166 extends along a hub inlet conduit centerline 167 between a respective compression chamber inlet port 160 and a hub first conduit end 166a (also referred to as a hub inlet conduit intake end 166a) open to a respective hub header 164.

In the example illustrated, the hub inlet conduit centerline 167 curves circumferentially between the compression chamber inlet port 160 and the hub first conduit end 166a. In the example illustrated, the inlet conduit centerline 167 extends from the inlet conduit intake end 166a to the compression chamber inlet port 160 in a circumferential second direction (also referred to as a reverse direction) opposite the forward direction 112 for directing fluid passing radially outwardly through the inlet conduit 166 in the reverse direction. This can help provide an inflow velocity of the first fluid corresponding to the developed flow field in the radially inner portion of the compression chambers 120, and may help improve compression efficiency.

Referring to FIG. 3, in the example illustrated, a second-fluid evacuation space 170 is provided in the casing 102 for receiving the second fluid discharged from the hub manifold 128, and evacuating the second fluid from the casing 102. In the example illustrated, the second-fluid evacuation space 170 is provided in the hub manifold bore 156.

In the example illustrated, the turbine chamber outlet ductwork 132 includes a plurality of hub second conduits 168 (also referred to as hub outlet conduits 168) for conducting the second fluid from the turbine chamber outlet ports 162 to the second-fluid evacuation space 170. Referring to FIG. 5B, in the example illustrated, each outlet conduit 168 extends along a hub second conduit centerline 169 (also referred to as a hub outlet conduit centerline 169) between a respective turbine chamber outlet port 162 and a hub second conduit end 169a (also referred to as a hub outlet conduit discharge end 169a). The hub outlet conduit discharge end 169a is open to the hub body inner surface 154

(and the hub manifold bore 156, see FIG. 3) and is in fluid communication with the evacuation space 170.

In the example illustrated, the hub outlet conduit centerline 169 curves circumferentially between the turbine chamber outlet port 162 and the hub second conduit end 169a. In the example illustrated, the outlet conduit centerline 169 extends from the turbine chamber outlet port 162 to the outlet conduit discharge end 169a in the circumferential forward direction 112 for directing the second fluid passing radially inwardly through the hub outlet conduit 168 in the forward direction 112. This can help provide an outlet curvature having an intake portion corresponding to the developed flow field in the radially inner portion of the turbine chambers.

Referring to FIG. 3, the second fluid can be evacuated through the second-fluid evacuation space 170 in an axial direction. In the example illustrated, the second fluid is evacuated through the evacuation space 170 in the axially forward direction.

Referring still to FIG. 3, in the example illustrated, the shaft 110 includes a shaft body 172 in the hub manifold bore 156, and a shaft bore 174 in the shaft body 172 coaxial with the drive axis 104. In the example illustrated, the shaft bore 174 comprises the second-fluid evacuation space 170. In the example illustrated, the shaft 110 includes a plurality of shaft ports 176 extending radially through the shaft body 172 and between respective hub outlet conduits 168 and the second-fluid evacuation space 170 for conducting the second fluid from the outlet conduits 168 to the evacuation space 170.

In the example illustrated, at least a portion of the hub body 150 is formed of a thermally conductive material for conductively transferring heat between the first fluid passing through the compression chamber inlet ductwork 130 and the second fluid passing through the turbine chamber outlet ductwork 132.

Referring to FIG. 2, in the example illustrated, the shroud manifold 138 is fixed to rotate with the shaft 110 about the drive axis 104, and forms part of the rotor assembly of the drive 100. Referring to FIG. 3, the shroud manifold 138 includes a shroud body 180 coaxial with the drive axis 104, and each of the turbine chamber inlet ductwork 140 and the compression chamber outlet ductwork 142 is internal the shroud body 180.

In the example illustrated, the shroud body 180 is generally cylindrical. The shroud body 180 includes a shroud body first endface 180a, and a shroud body second endface 180b axially opposite the shroud body first endface 180a (see also FIGS. 2A and 2C). In the example illustrated, the shroud body first endface 180a is located toward the casing rear end 108, and the shroud body second endface 180b is spaced apart from the shroud body first endface 180a toward the casing front end 106.

In the example illustrated, the shroud body 180 includes a shroud body inner surface 184 directed radially inwardly toward the disc pack 114 and extending axially between the first and second endfaces 180a, 180b. In the example illustrated, the shroud body 180 includes a radially outwardly directed shroud body outer surface 182 radially opposite the shroud body inner surface 184 and extending axially between the shroud body first and second endfaces 180a, 180b. In the example illustrated, the shroud manifold 138 includes a shroud manifold bore 186 in the shroud body 180 coaxial with the drive axis 104, and bounded radially by the shroud body inner surface 184. The shroud manifold bore 186 is sized to receive the disc pack 114 therein, and the disc spaces 118 are bounded radially by the shroud body inner surface 184.

In the example illustrated, the turbine chamber inlet ductwork 140 includes a plurality of shroud first ports 190 (also referred to as turbine chamber inlet ports 190) open to the shroud body inner surface 184 for discharging the second fluid from the turbine chamber inlet ductwork 140 and into the turbine chambers 122 to urge rotation of the disc pack 114 in the forward direction 112. In the example illustrated, the compression chamber outlet ductwork 142 includes a plurality of shroud second ports 192 (also referred to as compression chamber outlet ports 192) open to the body inner surface 184 for evacuating the first fluid from the compression chambers 120 and into the compression chamber outlet ductwork 142.

Figure 2C:
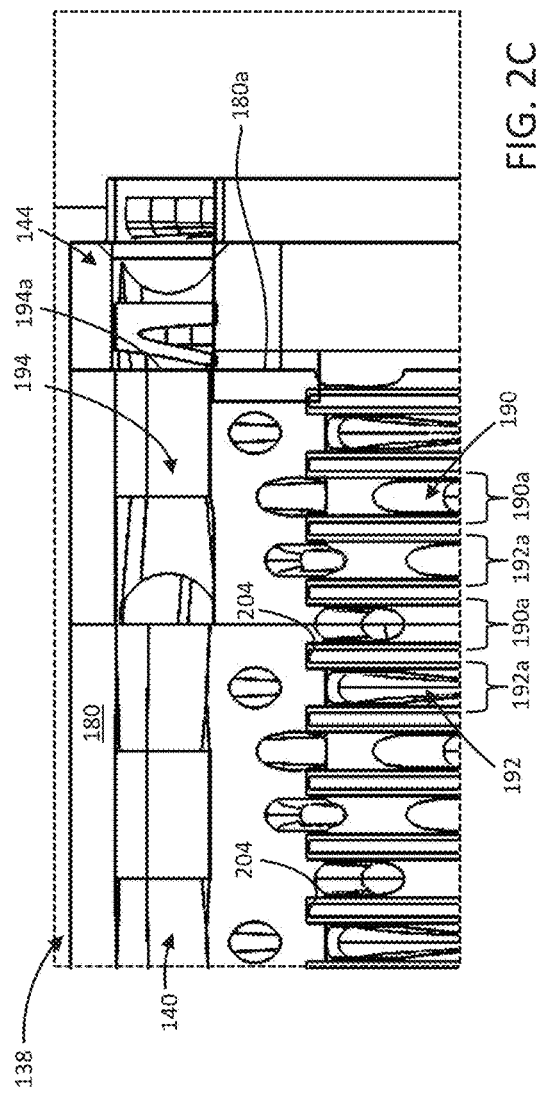
FIG. 2C is another enlarged portion of FIG. 2, showing rear portions of the shroud manifold.

Referring to FIG. 2C, in the example illustrated, the plurality of turbine chamber inlet ports 190 are arranged in axially spaced apart shroud first sets 190a (also referred to as shroud inlet sets 190a), with each set 190a of turbine chamber inlet ports 190 open to a respective turbine chamber 122. In the example illustrated, the plurality of compression chamber outlet ports 192 are arranged in axially spaced apart shroud second sets 192a (also referred to as shroud outlet sets 192a), with each set of compression chamber outlet ports 192 open to a respective compression chamber 120. In the example illustrated, the shroud inlet sets 190a alternate axially with the shroud outlet sets 192a.

Referring to FIG. 5A, in the example illustrated, the turbine chamber inlet ports 190 in each set 190a are spaced circumferentially apart from one another about the drive axis 104. In the example illustrated, the turbine chamber inlet ports 190 in each set 190a lie in a common shroud first plane 193a oriented normal to the drive axis 104. In the example illustrated, each shroud first plane 193a is coincident with a respective hub second plane 163b, and the turbine chamber inlet ports 190 open to a respective turbine chamber 122 are generally in axial alignment with the turbine chamber outlet ports 162 open to that same turbine chamber 122.

Referring to FIG. 4A, in the example illustrated, the compression chamber outlet ports 192 in each set 192a are spaced circumferentially apart from one another about the drive axis 104. In the example illustrated, the compression chamber outlet ports 192 in each set 192a lie in a common shroud second plane 193b oriented normal to the drive axis. In the example illustrated, each shroud second plane 193b is coincident with a respective hub first plane 163a, and the compression chamber outlet ports 192 open to a respective compression chamber 120 are generally in axial alignment with the compression chamber inlet ports 160 open to that same compression chamber 120.

Referring to FIG. 3, in the example illustrated, the turbine chamber inlet ductwork 140 includes a plurality of circumferentially spaced apart shroud headers 194 in fluid communication with the turbine chamber inlet ports 190 (see also FIG. 5A). Each shroud header 194 extends along a shroud header centerline 195 between a shroud header first end 194a open to the shroud body first endface 180a for receiving the second fluid and a shroud header second end 194b spaced axially apart from the shroud header first end 194a toward the shroud body second endface 180b. In the example illustrated, the shroud header centerline 195 extends generally parallel to the drive axis 104.

Referring to FIG. 2C, in the example illustrated, the shroud manifold 138 includes a plurality of shroud aerodynamic features 144 extending at least partially across the shroud header first ends 194a and fixed to rotate with the shroud body 180 for conditioning flow of the second fluid entering the shroud headers 194. Referring to FIG. 5A, in the example illustrated, the shroud aerodynamic features 144 comprise shroud airfoils 146. The shroud airfoils 146 are spaced circumferentially apart from one another about the drive axis 104 and extend radially across respective shroud header first ends 194a.

Referring to FIG. 3, in the example illustrated, the turbine chamber inlet ductwork 140 includes a plurality of shroud first conduits 196 (also referred to as shroud inlet conduits 196) for conducting the second fluid from the shroud headers 194 to the turbine chamber inlet ports 190. Referring to FIG. 5A, each shroud inlet conduit 196 extends along a shroud first conduit centerline 197 (also referred to as shroud inlet conduit centerline 197) between a respective turbine chamber inlet port 190 and a shroud first conduit end 196a (also referred to as a shroud inlet conduit intake end 196a) open to a respective shroud header 194.

In the example illustrated, the shroud inlet conduit centerline 197 curves circumferentially between the turbine chamber inlet port 190 and the shroud inlet conduit intake end 196a. In the example illustrated, the shroud inlet conduit centerline 197 extends from the inlet conduit intake end 196a to the turbine chamber inlet port 190 in the circumferential forward direction 112 for directing fluid passing radially inwardly through the shroud inlet conduit 196 and into a respective turbine chamber 122 in the forward direction 112 to urge rotation of the disc pack 114.

Referring to FIG. 3, in the example illustrated, a first-fluid evacuation space 178 is provided in the casing 102 for receiving the first fluid discharged from the shroud manifold 138, and evacuating the first fluid from the casing 102. In the example illustrated, the first-fluid evacuation space 178 is radially intermediate the shroud manifold 138 and an inner surface 103 of the casing 102. In the example illustrated, the first-fluid evacuation space 178 is bounded radially by the shroud body outer surface 182. The first fluid can be evacuated through the first-fluid evacuation space 178 in an axial direction. In the example illustrated, the second fluid is evacuated through the evacuation space 178 in the axially rearward direction. In some examples, the first-fluid evacuation space 178 can comprise a vaneless space open to a semi-vaneless space in the casing for facilitating diffusion of the first fluid.

Referring still to FIG. 3, in the example illustrated, the compression chamber outlet ductwork 142 includes a plurality of shroud second conduits 198 (also referred to as shroud outlet conduits 198) for conducting the first fluid from the compression chamber outlet ports 192 to the first-fluid evacuation space 178. Referring to FIG. 4A, each outlet conduit 198 extends along a shroud outlet conduit centerline 199 between a respective compression chamber outlet port 192 and a shroud second conduit end 198a (also referred to as a shroud outlet conduit discharge end 198a) open to the shroud body outer surface 182 and in fluid communication with the first-fluid evacuation space 178. In the example illustrated, the shroud outlet conduit centerline 199 curves circumferentially between the chamber outlet port 192 and the shroud outlet conduit discharge end 198a.

In the example illustrated, the shroud outlet conduit 198 includes an intake portion 200 extending along an intake portion centerline 201 from the compression chamber outlet port 192 toward the outlet conduit discharge end 198a. In the example illustrated, the intake portion centerline 201 curves circumferentially from the compression chamber outlet port 192 toward the outlet conduit discharge end 198a. In the example illustrated, the intake portion centerline 201 extends from the compression chamber outlet port 192 toward the outlet conduit discharge end 198a in the circumferential reverse direction (opposite the forward direction 112) for directing the first fluid entering and passing radially outwardly through the intake portion 200 in the reverse direction. This can help accommodate the developed flow field in the radially outer portion of the compression chambers.

In the example illustrated, the shroud outlet conduit 198 includes a discharge portion 202 extending along a discharge portion centerline 203 from the intake portion 200 to the outlet conduit discharge end 198a. In the example illustrated, the discharge portion centerline 203 curves circumferentially from the intake portion 200 to the outlet conduit discharge end 198a. The discharge centerline 203 and the intake portion centerline 201 can curve in circumferentially opposite directions.

In the example illustrated, the discharge portion centerline 203 can extend from the intake portion 200 to the outlet conduit discharge end 198a in one of the circumferential forward direction 112 and the reverse direction for directing the first fluid passing radially outwardly through the discharge portion 202 and into the evacuation space 178 in the one of the forward direction 112 and the reverse direction. In the example illustrated, the discharge portion centerline 203 extends from the intake portion 200 to the outlet conduit discharge end 198a in the circumferential forward direction 112 for directing the first fluid passing radially outwardly through the discharge portion 202 and into the evacuation space 178 in the forward direction 112. This can help machine performance.

The drive 100 can include one or more disc mounting features. The disc mounting features can, for example, facilitate axial positioning of the discs 116 and/or rotational locking of the disc pack 114 with one or both of the hub manifold 128 and the shroud manifold 138. The disc mounting features can include, for example, weldments, keys, keyways, and/or spacers. In some examples, the disc pack can be bonded (e.g. welded or adhered) to one or both of the hub manifold body and the shroud manifold body to rotationally lock the disc pack 114 thereto.

Referring to FIG. 2C, in the example illustrated, the disc mounting features include a plurality of axially spaced apart circumferential shroud grooves 204 in the shroud body inner surface 184. Each shroud groove 204 is axially intermediate a respective shroud inlet set 190a of turbine chamber inlet ports 190, and a respective axially adjacent shroud outlet set 192a of compression chamber outlet ports 192. In the example illustrated, each shroud groove 204 receives a radially outer peripheral edge of a respective disc 116 to facilitate axial positioning of the discs 116.

Referring to FIG. 6C, in the example illustrated, the disc mounting feature further includes a plurality of axially spaced apart circumferential hub grooves 205 (shown schematically in FIG. 6C-see also grooves 1205 in FIGS. 9A and 9B) in the hub body outer surface 152. Each hub groove 205 is axially intermediate a respective hub inlet set 160a of compression chamber inlet ports 160 and a respective axially adjacent hub outlet set 162a of turbine chamber outlet ports 162. Each hub groove 205 can receive a radially inner peripheral edge of a respective disc 116 to facilitate axial positioning of the discs. In the example illustrated, the shroud and hub grooves 204, 205 are in axial alignment with one another.

The discs 116 can be positioned into the shroud grooves 204 through, for example, thermal expansion of the shroud body 180 relative to the discs 116 and/or thermal contraction of the discs 116 relative to the shroud body 180. The discs 116 can be positioned into the hub grooves 205 through, for example, thermal contraction of the hub body 150 relative to the discs 116 and/or thermal expansion of the discs 116 relative to the hub body 150.

In some examples, the disc mounting feature includes an interference structure for engagement with the disc pack 114 to rotationally lock the disc pack 114 with one or both of the hub manifold 128 and the shroud manifold 138. The interference structure can comprise, for example, axially facing groove surfaces of the shroud grooves 204 and/or the hub grooves 205 for providing an interference fit with the discs 116. In some examples, the interference structure can include, for example, protrusions, pins, and/or keys for engagement with corresponding recesses, apertures, and/or keyways in one or more discs 116 to rotationally lock the disc pack 114 with one or both of the hub manifold 128 and the shroud manifold 138.

Figure 8:
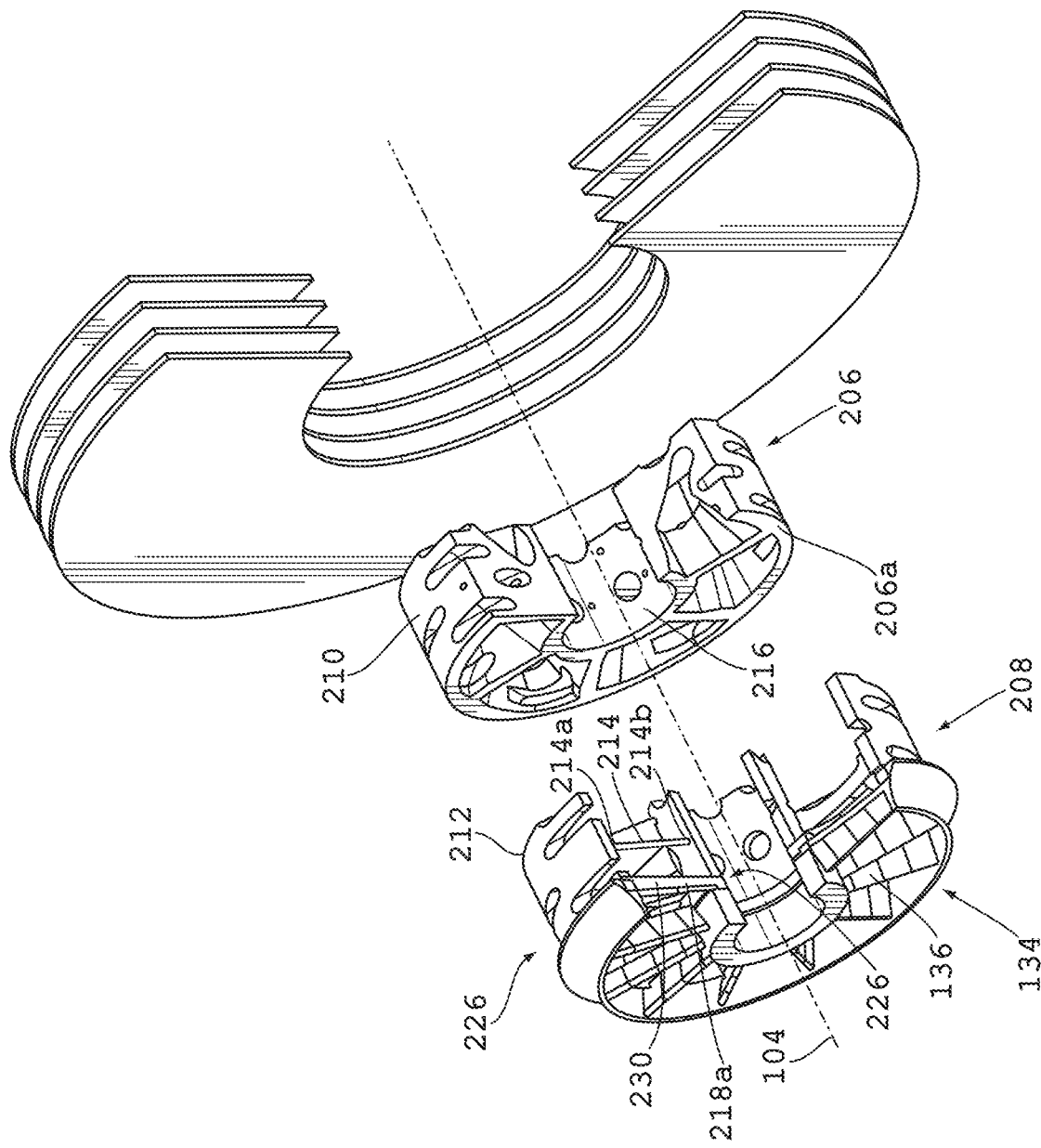
FIG. 8 is an exploded view of portions of a hub manifold structure and a disc pack of the drive of FIG. 1.

Referring to FIG. 8, in the example illustrated, the hub body 150 includes a core 206 coaxial with the drive axis 104 and through which at least a portion of the compression chamber inlet ductwork 130 and the turbine chamber outlet ductwork 132 passes. In the example illustrated, the hub headers 164, hub inlet conduits 166, and hub outlet conduits 168 pass through the core 206 (see also FIG. 4B).

Referring still to FIG. 8, in the example illustrated, the core 206 is of integral, unitary, one-piece construction. The core 206 can be formed using, for example, a 3D printing or casting process which can help provide for complex ductwork geometry internal the core 206. In some cases, components formed using such processes may have limited structural integrity and/or material properties that may be less than ideal for rotary applications involving high rotational and/or thermal stresses. In the example illustrated, the hub body 150 includes a frame 208 mounted to the core 206 for exerting an inwardly directed force on the core 206 to regulate a stress distribution therein during operation (see also FIGS. 6A and 6B). This can help improve, for example, the operating range and/or life expectancy of the core 206.

Referring to FIG. 8, in the example illustrated, the core 206 has a radially outwardly directed core outer surface 210, and the frame 208 includes an outer sleeve 212 mounted over the core 206 and in engagement with the core outer surface 210 for inducing radial compression of the core 206 during operation. In the example illustrated, the outer sleeve 212 comprises the hub body outer surface 152. In some examples, the outer sleeve 212 can induce radial compression through, for example, an interference fit with the core outer surface 210, and/or through a clamping assembly.

In the example illustrated, the frame 208 includes a plurality of anchors 214. Each anchor 214 extends between an anchor outer end 214a fixed to the outer sleeve 212 and an anchor inner end 214b fixed to the shaft 110 for inducing radial compression of the core 206. In the example illustrated, the hub body 150 includes a plurality of apertures 216 passing radially through the core 206, and the anchors 214 extend through respective apertures 216. This can facilitate alignment between the ductwork portions passing through the outer sleeve 212 and the ductwork portions internal the core 206, and between the shaft ports 176 and the ductwork portions internal the core 206.

Figure 2D:
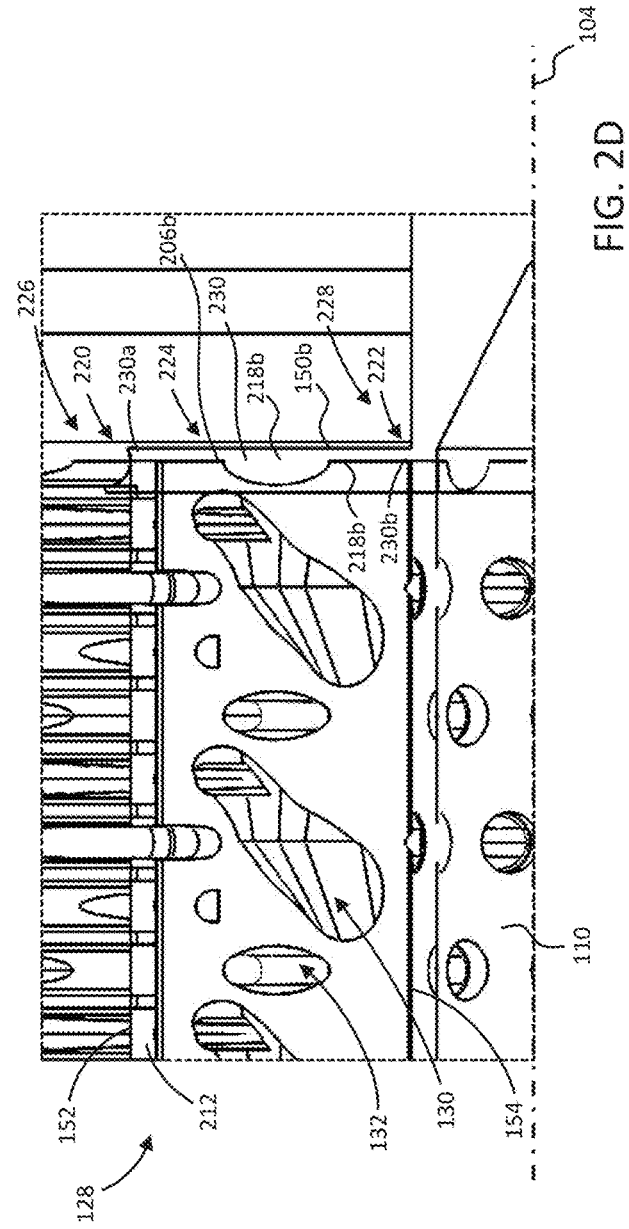
FIG. 2D is another enlarged portion of FIG. 2, showing rear portions of the hub manifold.

Referring to FIGS. 2B and 2D, in the example illustrated, the core 206 has a core first endface 206a and a core second endface 206b axially opposite the core first endface 206a. The frame 208 includes a first end cap 218a in engagement with the core first endface 206a, and a second end cap 218b in engagement with the core second endface 206b. The first and second end caps 218a, 218b can be anchored to one another for inducing axial compression of the core 206 during operation. In the example illustrated, the first and second end caps 218a, 218b are anchored to one another via the outer sleeve 212.

Referring to FIG. 2D, in the example illustrated, each of the first and second endcaps 218a, 218b has a radially outer endcap portion 220 fixed to the outer sleeve 212 and the disc pack 114, a radially inner endcap portion 222 fixed to the shaft 110, and a radially intermediate endcap portion 224 connecting the radially outer endcap portion 220 and the radially inner endcap portion 222.

In the example illustrated, torque load between the disc pack 114 and the shaft 110 is transferred through the frame 208. This can help reduce torque load transfer through the core 206, which may help improve the operating range and/or life expectancy of the core 206. In the example illustrated, the frame 208 includes a disc pack mounting portion 226 for engagement with the disc pack 114 to fix the disc pack to the hub body 150. The disc pack mounting portion 226 can include the outer sleeve 212, and/or the radially outer endcap portions 220.

In the example illustrated, the frame 208 includes a shaft mounting portion 228 for engagement with the shaft 110 to fix the shaft 110 to the frame 208. The shaft mounting portion 228 is spaced radially inwardly apart from the disc pack mounting portion 226. In the example illustrated, the shaft mounting portion 228 includes the radially inner endcap portions 222.

In the example illustrated, the frame 208 includes one or more torque-transfer members 230 for transferring torque between the disc pack mounting portion 226 and the shaft mounting portion 228. Referring to FIG. 2D, each torque-transfer member 230 has a radially outer end 230a fixed to the disc pack mounting portion 226 and a radially inner end 230b fixed to the shaft mounting portion 228. In the example illustrated, the torque-transfer members 230 include the radially intermediate endcap portions 224.

Referring to FIG. 8, in the example illustrated, hub aerodynamic features 134 are mounted to the frame 208.

Figure 9A:
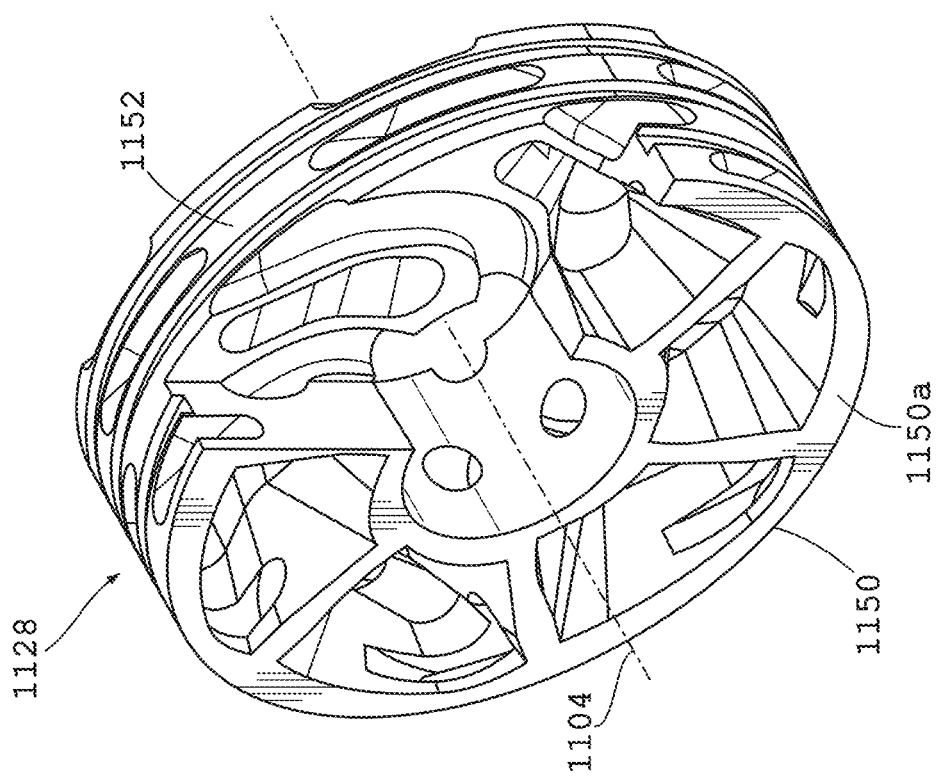
FIG. 9A is a front perspective partial cut-away view of a portion of another hub manifold for a drive like that of FIG. 1, showing portions of an internal hub ductwork arrangement of the hub manifold.
Figure 9B:
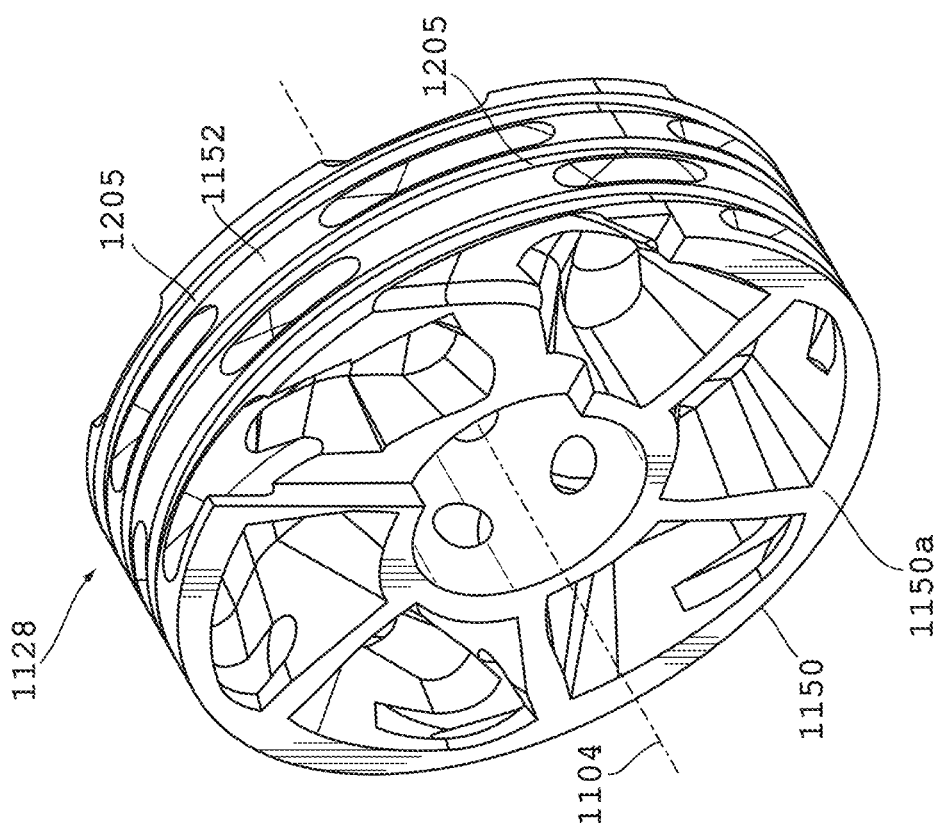
FIG. 9B is a front perspective partial cut-away view of another portion of hub manifold of FIG. 9A, showing portions of another internal hub ductwork arrangement of the hub manifold.

Referring to FIGS. 9A-9B, an example of another hub manifold 1128 for a rotor assembly of a cohesion-type drive is illustrated. The manifold 1128 has similarities to the hub manifold 128, and like features are identified by like reference characters, incremented by 1000.

In the example illustrated, the manifold 1128 includes a manifold body 1150 extending along a drive axis 1104 for rotation thereabout. The body 1150 includes a first endface 1150a, a second endface axially opposite the first endface 1150a, and a radially outwardly directed body outer surface 1152 extending between the first and second endfaces 1150a, 1150b. In the example illustrated, the body is of integral, unitary, one-piece construction. In the example illustrated, the hub manifold includes a plurality of grooves 1205 in the body outer surface 1152 for receiving radially inner peripheral edges of discs of the drive to facilitate mounting of the discs.

Referring to FIG. 10, another example of a cohesion-type drive 2100 is illustrated schematically. The cohesion-type drive 2100 has similarities to the drive 100, and like features are identified by like reference characters, incremented by 2000. In the example illustrated, the drive 2100 includes a hub manifold 2128 having a manifold body 2150 extending along a drive axis 2104 for rotation thereabout. The body 2150 includes a first endface 2150a, a second endface 2150b axially opposite the first endface 2150a, a radially outwardly directed outer surface 2152 extending between the first and second endfaces 2150a, 2150b, and a radially inwardly directly inner surface 2154 radially opposite the outer surface 2152.

In the example illustrated, the body 2150 is tapered radially along the drive axis 2104. This can allow for a variation in an inner radius of the first and second working chambers 2120, 2122 along the drive axis 2104, and can facilitate optimization of, for example, mass flow and work. In the example illustrated, the outer surface 2152 is spaced radially apart from the drive axis by a body outer radius 2232. In the example illustrated, the body outer radius 2232 decreases along the drive axis 2104 from the first endface 2150a toward the second endface 2150b of the body 2150. In the example illustrated, the inner surface 2154 is spaced radially apart from the drive axis 2104 by a body inner radius 2234. In the example illustrated, the body inner radius 2234 decreases along the drive axis 2104 from the first endface 2150a toward the second endface 2150b of the body 2150.

Figure 11:
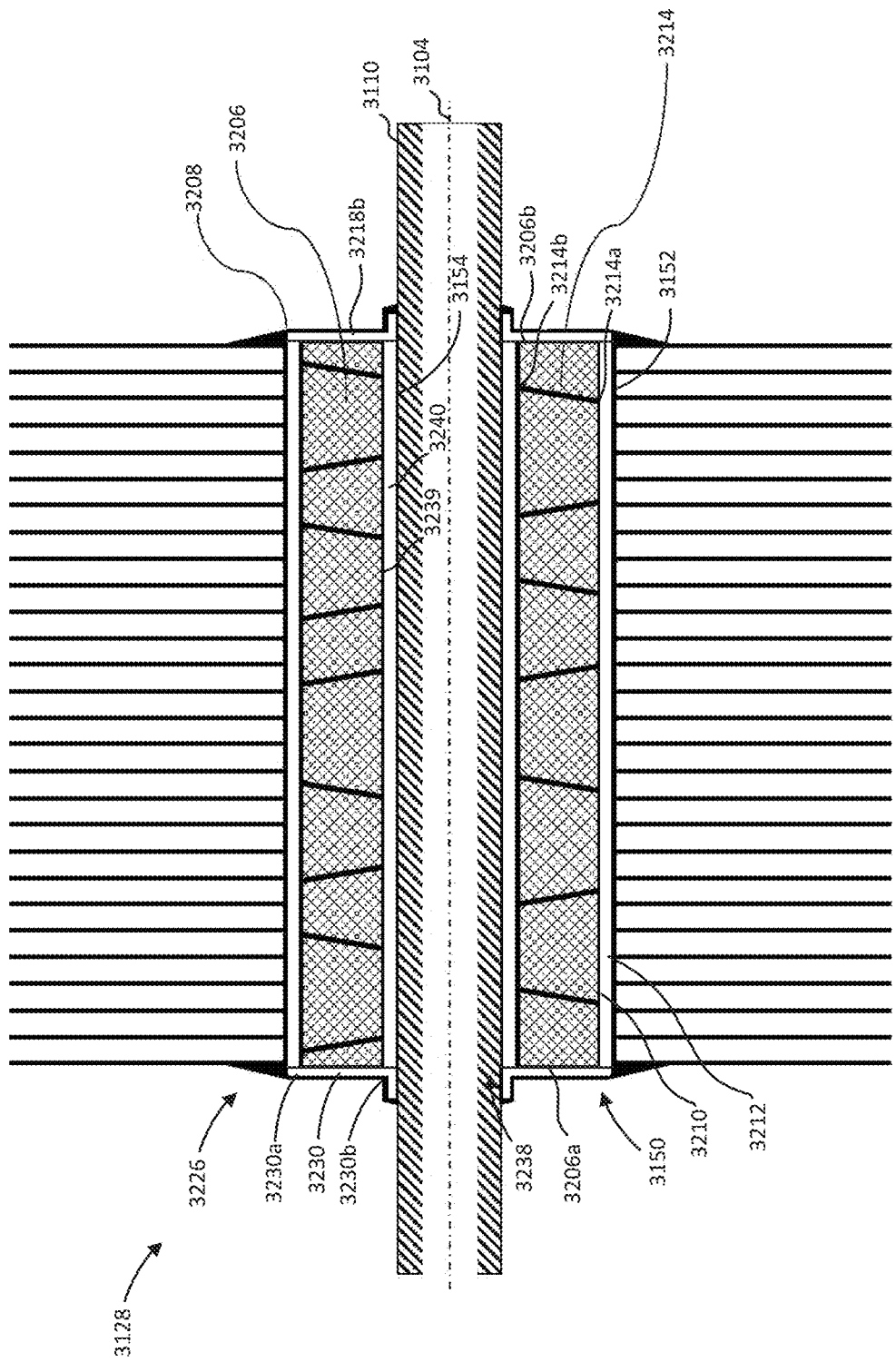
FIG. 11 is a simplified schematic representation of another hub manifold for a drive like that of FIG. 1.

Referring to FIG. 11, an example of another manifold 3128 for a rotor assembly of a cohesion-type drive is illustrated schematically. The manifold 3128 has similarities to the hub manifold 128, and like feature are identified by like reference characters, incremented by 3000.

In the example illustrated, the manifold 3128 includes a manifold body 3150 extending along a drive axis 3104 for rotation thereabout. The body 3150 includes a core 3206 coaxial with the drive axis 3104, and a frame 3208 mounted to the core 3206 for exerting an inwardly directed force on the core 3206 to regulate a stress distribution therein during operation of the drive. The manifold body 3150 includes ductwork internal the body 3150 for fluid communication with a plurality of working chambers of the drive. At least a portion of the ductwork passes through the core 3206.

In the example illustrated, the core 3206 has a radially outwardly directed core outer surface 3210, and the frame 3208 includes an outer sleeve 3212 mounted over the core 3206 and in engagement with the core outer surface 3210 for inducing radial compression of the core 3206 during operation.

In the example illustrated, the body 3150 includes a core bore 3238 in the core 3206 coaxial with the drive axis 3104 and bounded by a radially inwardly directed core inner surface 3239 of the core 3206. In the example illustrated, the frame 3208 includes an inner sleeve 3240 in the core bore 3238 and in engagement with the core inner surface 3239. In the example illustrated, the outer and inner sleeves 3212, 3240 are anchored to one another for inducing radial compression of the core 3206 during operation. In the example illustrated, the outer sleeve 3212 comprises a body outer surface 3152 of the manifold body 3150, and the inner sleeve 3240 comprises a body inner surface 3154 of the manifold body 3150.

In the example illustrated, the frame 3208 includes a plurality of anchors 3214 anchoring the outer and inner sleeves 3212, 3240 to one another. Each anchor 3214 extends between an anchor outer end 3214a fixed to the outer sleeve 3212 and an anchor inner end 3214b fixed to the inner sleeve 3240. In the example illustrated, the anchor outer ends 3214a are axially offset from the anchor inner ends 3214b. In the example illustrated, the manifold body 3150 includes a plurality of apertures passing radially through the core 3206 between the core outer and inner surfaces 3210, 3239, and the anchors extend through respective apertures.

In the example illustrated, the core 3206 has a core first endface 3206a and a core second endface 3206b axially opposite the core first endface 3206a. In the example illustrated, the frame 3208 includes a first end cap 3218a in engagement with the core first endface 3206a and a second end cap 3218b in engagement with the core second endface 3206b. The first and second end caps 3218a, 3218b are anchored to one another for inducing axial compression of the core 3206 during operation. In the example illustrated, the first and second end caps 3218a, 3218b are anchored to one another via the outer and inner sleeves 3212, 3240.

In the example illustrated, torque load between a disc pack 3114 and a shaft 3110 is transferred through the frame 3208. In the example illustrated, the frame 3208 includes a disc pack mounting portion 3226 for engagement with the disc pack 3114 to fix the disc pack to the frame 3208. The disc pack mounting portion 3226 can include the outer sleeve 3212, and/or radially outer endcap portions.

In the example illustrated, the frame 3208 includes a shaft mounting portion 3228 for engagement with the shaft 3110 to fix the shaft 3110 to the frame 3208. The shaft mounting portion 3228 is spaced radially inwardly from the disc pack mounting portion 3226. The shaft mounting portion 3228 can include the inner sleeve 3240 and/or radially inner endcap portions.

In the example illustrated, the frame 3208 includes one or more torque-transfer members 3230 for transferring torque between the disc pack mounting portion 3226 and the shaft mounting portion 3228. Each torque-transfer member 3230 has a radially outer end 3230a fixed to the disc pack mounting portion 3226 and a radially inner end 3230b fixed to the shaft mounting portion 3228. In the example illustrated, the torque-transfer members 3230 include radially intermediate endcap portions 3224.

Figure 12:
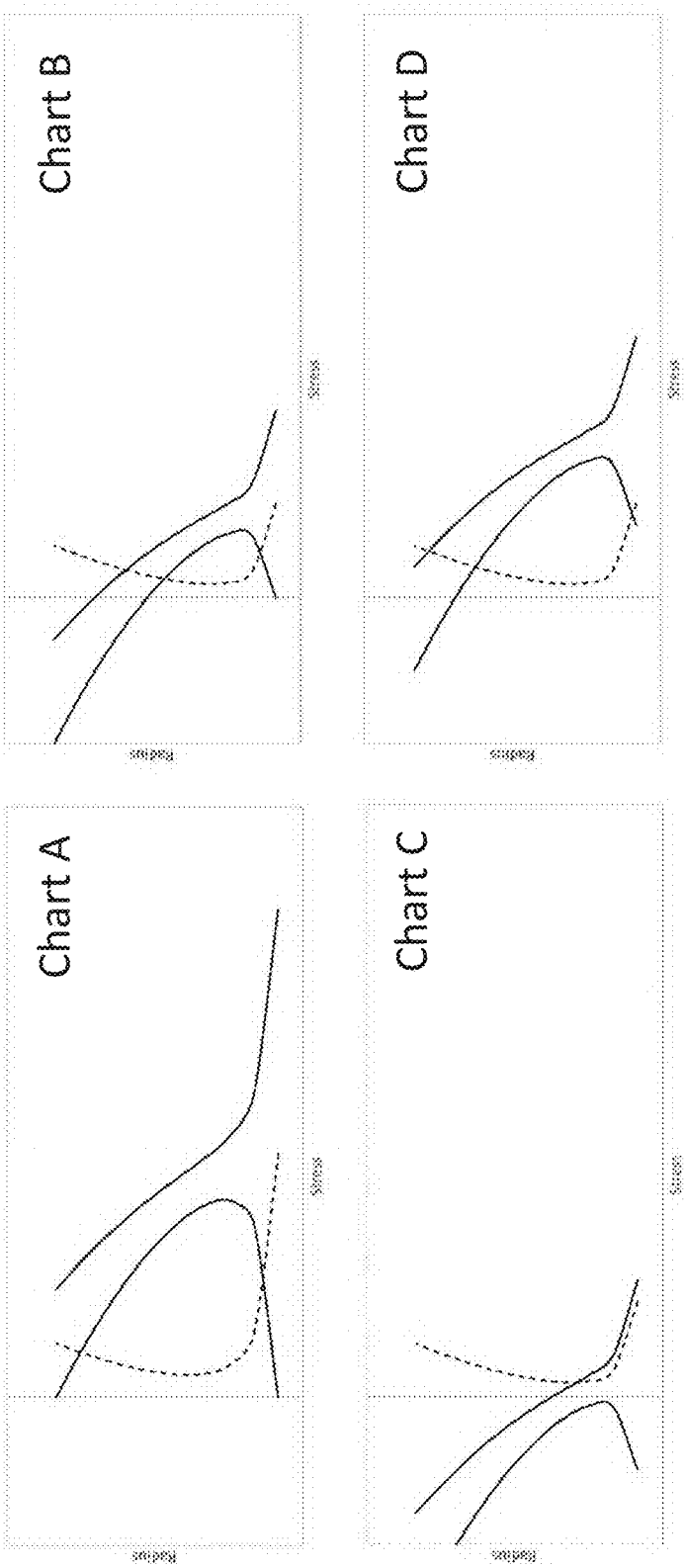
FIG. 12 includes charts and a table showing the difference in stress distribution for a hollow rotating disc with and without imposed radial loads at the inner and outer radiuses.

Referring to FIG. 12, charts A-D show the difference in stress distribution for a hollow rotating disc with and without imposed radial loads at the inner and outer radiuses. The charts A-D show radial, hoop, and shear stress distribution in the rotating disc for the four different boundary conditions outlined in Table 1 of FIG. 12. The stresses are radial and normalized by a factor of $(\rho\omega^2)/8$, with a positive stress indicating a tensile load. Radial and hoop stresses are shown in solid lines, and shear stress is shown in dashed lines.

These charts demonstrate how pre-stressing a hollow rotating disc, such as, for example, the core 3206, may help reduce maximum shear stress under loading. This may improve the range of operation or life expectancy such components, and may also allow for control of the stress distribution throughout through variation in the boundary conditions, which may be helpful in cases where the components are of limited structural integrity.

The invention claimed is:

1. A rotary manifold for a cohesion-type drive, comprising:
   a) a manifold body extending along a drive axis for rotation about the drive axis, the body including a core coaxial with the drive axis, and a frame mounted to the core for exerting an inwardly directed force on the core to regulate a stress distribution therein during operation of the drive; and
   b) ductwork internal the body for fluid communication with a plurality of working chambers of the drive, at least a portion of the ductwork passing through the core, wherein the core has a radially outer surface, and the frame includes an outer sleeve mounted over the core in engagement with the radially outer surface for inducing radial compression of the core during operation, and wherein the ductwork includes a plurality of conduits extending through the core, each conduit open to the radially outer surface for fluid communication with a respective working chamber of the plurality of working chambers through a respective opening in the outer sleeve.

2. The rotary manifold of claim 1, wherein the core is of integral, unitary, one-piece construction.

3. The rotary manifold of claim 1, wherein the core is formed through an additive manufacturing process.

4. The rotary manifold of claim 3, wherein the core is of integral, unitary, one-piece construction.

5. The rotary manifold of claim 1, wherein the core extends circumferentially about the drive axis.

6. A rotary manifold for a cohesion-type drive, comprising:
 a) a manifold body extending along a drive axis for rotation about the drive axis, the body including a core coaxial with the drive axis, and a frame mounted to the core for exerting an inwardly directed force on the core to regulate a stress distribution therein during operation of the drive; and
 b) ductwork internal the body for fluid communication with a plurality of working chambers of the drive, at least a portion of the ductwork passing through the core, wherein the core has a radially outer surface, and the frame includes an outer sleeve mounted over the core in engagement with the radially outer surface for inducing radial compression of the core during operation; and wherein the plurality of working chambers are defined by a disc pack mountable to the manifold body and include a plurality of first chambers and a plurality of second chambers alternating axially with and in fluid isolation of the plurality of first chambers, and wherein the ductwork comprises a first ductwork for fluid communication with the plurality of first chambers and a second ductwork for fluid communication with the plurality of second chambers, the second ductwork in fluid isolation of the first ductwork within the manifold body.

7. The rotary manifold of claim 6, wherein the core is of integral, unitary, one-piece construction.

8. The rotary manifold of claim 6, wherein the core is formed through an additive manufacturing process.

9. The rotary manifold of claim 8, wherein the core is of integral, unitary, one-piece construction.

10. The rotary manifold of claim 6, wherein the core extends circumferentially about the drive axis.

11. The rotary manifold of claim 6, wherein the ductwork passes through the frame for fluid communication with the plurality of working chambers.

12. A rotary manifold for a cohesion-type drive having a disc pack defining a plurality of first working chambers and a plurality of second working chambers axially interspersed between and in fluid isolation of the plurality of first working chambers, the rotary manifold comprising:
 a) a manifold body extending along and rotatable about a drive axis, and the manifold body including a core coaxial with the drive axis and a frame mounted radially over the core for compressive engagement therewith to regulate a stress distribution in the core during operation of the cohesion-type drive;
 b) a first ductwork internal the manifold body and passing through the core and the frame for fluid communication with the plurality of first working chambers; and
 c) a second ductwork internal the manifold body and in fluid isolation of the first ductwork, the second ductwork passing through the core and the frame for fluid communication with the plurality of second working chambers.

13. The rotary manifold of claim 12, wherein the frame comprises an outer sleeve mounted over a radially outer surface of the core.

14. The rotary manifold of claim 12, wherein the first ductwork comprises a plurality of headers extending along and spaced apart from each other about the drive axis, each header of the plurality of headers open to the plurality of first working chambers through respective ports in the manifold body.

15. The rotary manifold of claim 12, wherein the second ductwork comprises a plurality of conduits, each conduit extending radially through the manifold body.

16. The rotary manifold of claim 12, wherein the core is of integral, unitary, one-piece construction.

17. The rotary manifold of claim 12, wherein core is formed through an additive manufacturing process.

18. The rotary manifold of claim 17, wherein the core is of integral, unitary, one-piece construction.

19. The rotary manifold of claim 12, wherein the core extends circumferentially about the drive axis.

* * * * *

UNITED STATES PATENT AND TRADEMARK OFFICE
CERTIFICATE OF CORRECTION

PATENT NO. : 12,044,129 B2
APPLICATION NO. : 18/085841
DATED : July 23, 2024
INVENTOR(S) : Daniel Matthew McGuire It is certified that error appears in the above-identified patent and that said Letters Patent is hereby corrected as shown below:

In the Claims

Claim 17, Column 24, Line 39:
"The rotary manifold of claim 12, wherein core is"
Should read:
-- The rotary manifold of claim 12, wherein the core is --

Signed and Sealed this
Twenty-sixth Day of November, 2024

Katherine Kelly Vidal
*Director of the United States Patent and Trademark Office*